(12) United States Patent
Estehghari et al.

(10) Patent No.: US 9,646,161 B2
(45) Date of Patent: May 9, 2017

(54) RELATIONAL DATABASE FINGERPRINTING METHOD AND SYSTEM

(71) Applicant: Xerox Corporation, Norwalk, CT (US)

(72) Inventors: Saghar Estehghari, La Tronche (FR); Nicolas Guerin, Notre-Dame-de-Mésage (FR)

(73) Assignee: Xerox Corporation, Norwalk, CT (US)

( * ) Notice: Subject to any disclaimer, the term of this patent is extended or adjusted under 35 U.S.C. 154(b) by 110 days.

(21) Appl. No.: 14/581,390

(22) Filed: Dec. 23, 2014

(65) Prior Publication Data

US 2016/0180097 A1 Jun. 23, 2016

(51) Int. Cl.
| | |
|---|---|
| H04L 29/06 | (2006.01) |
| G06F 21/60 | (2013.01) |
| H04L 9/08 | (2006.01) |
| H04L 9/32 | (2006.01) |
| G06F 17/30 | (2006.01) |

(52) U.S. Cl.
CPC ...... *G06F 21/602* (2013.01); *G06F 17/30595* (2013.01); *H04L 9/0822* (2013.01); *H04L 9/0825* (2013.01); *H04L 9/0863* (2013.01); *H04L 9/0866* (2013.01); *H04L 9/3226* (2013.01); *H04L 63/045* (2013.01); *H04L 63/083* (2013.01); *H04L 63/0807* (2013.01); *H04L 63/0853* (2013.01)

(58) Field of Classification Search
CPC .................................................. G06F 21/6218
See application file for complete search history.

(56) References Cited

U.S. PATENT DOCUMENTS

2013/0191650 A1 7/2013 Balakrishnan et al.
2016/0180097 A1* 6/2016 Estehghari .......... H04L 63/0853
713/189

OTHER PUBLICATIONS

Li, Yingjiu, et al., "Fingerprinting Relational Databases: Schemes adn Specialties," IEEE Trans. Dependable Secur. Comput. 2, 1, 34-45 (Jan. 2005). (cited in applicant's IDS).*
Agrawal et al., "Watermarking Relational Databases", IBM Almaden Research Center, Proceedings of the 28th VLDB Conference, Hong Kong, China 2002, 12 pages. (Cited in applicant's IDS).*
U.S. Appl. No. 14/107,477, filed Dec. 17, 2013, Meunier et al.
U.S. Appl. No. 14/255,252, filed Apr. 17, 2014, Estehghari et al.
Dunston, Duane, "h2H Messenger," pp. 1-3, downloaded at https://github.com/learnsia/h2HMessenger, on Feb. 18, 2014.
Hanyurwimfura, D., et al., "Text format based relational database watermarking for non-numeric data," Intern'l Conf. on Computer Design and Applications (ICCDA), vol. 4, pp. 312-316 (Jun. 2010).

(Continued)

*Primary Examiner* — Jason K Gee
(74) *Attorney, Agent, or Firm* — Fay Sharpe LLP

(57) ABSTRACT

Disclosed is a relational database fingerprinting system and method to identify a user of the relational database, the fingerprint provided by an originator of the relational database. According to an exemplary method, a fingerprint bit string is generated including a data user identification code and a secret key unknown to the user, and the fingerprint bit string is embedded in a plurality of pseudorandomly selected values based on a pseudorandom function seeded with primary keys associated with the relational database.

8 Claims, 13 Drawing Sheets

(56) References Cited

OTHER PUBLICATIONS

Li, Yingjiu, et al., "Fingerprinting Relational Databases: Schemes and Specialties," *IEEE Trans. Dependable Secur. Comput.* 2, 1, 34-45 (Jan. 2005).
Odeh, A., et al., "Watermarking relational database systems," First Intern'l Conf. on the Applications of Digital Information and Web Technologies (ICADIWT 2008), pp. 270-274 (2008).
Popa, R.A., et al., CryptDB: protecting confidentiality with encrypted query processing. Proc. 23rd ACM Symp. on Operating Systems Principles (SOSP '11), pp. 85-100, ACM (2011).
Zhang, L, et al., "Relational databases watermarking for textual and numerical data," Intern'l Conf. on Mechatronic Science, Electric Engineering and Computer (MEC), pp. 1633-1636 (Aug. 2011).
CipherCloud, "Adopt the cloud," pp. 1-4, downloaded at http://www.ciphercloud.com/ on Feb. 18, 2014.
Amazon, "Amazon RDS for Oracle database," pp. 1-7, downloaded at aws.amazon.com/rds/oracle/ on Feb. 18, 2014.
Amazon, "Amazon RDS for Oracle Now Supports Transparent Data Encryption and Native Network Encryption," p. 1, downloaded at aws.amazon.com/.../amazon-rds-oracle-encryption on Feb. 18, 2014.
Wikipedia, "Trusted System," pp. 1-5, downloaded at http://en.wikipedia.org/wiki/Trusted_system on Feb. 18, 2014.
Windows Azure, "SQL Database," pp. 1-3, downloaded at http://www.windowsazure.com/en-us/services/data-management/ on Feb. 18, 2014.
Agrawal et al., "Watermarking Relational Databases", IBM Almaden Research Center, Proceedings of the 28th VLDB Conference, Hong Kong, China 2002, 12 pages.
Guo et al., "Fingerprinting Relational Databases", SAC'06, Apr. 23-27, 2006, Dijon, France, pp. 487-492.
Lafaye et al., "Watermill: An Optimized Fingerprinting System for Databases Under Constraints", IEEE Transactions on Knowledge and Data Engineering, vol. 20, No. 4, Apr. 2008, pp. 1-15.
"Levenshtein Distance", en.wikipedia.org/wiki/Levenshtein_distance, Printed Aug. 1, 2014, 7 pages.

* cited by examiner

RELATIONAL DATABASE FINGERPRINTING METHOD AND SYSTEM

CROSS REFERENCE TO RELATED PATENTS AND APPLICATIONS

U.S. patent application Ser. No. 14/255,252, field Apr. 17, 2014, by Estehghari, entitled "SEMI-TRUSTED DATA-AS-A-SERVER PLATFORM", is incorporated herein by reference in its entirety.

BACKGROUND

The exemplary embodiment relates to service platforms and finds particular application in connection with a system and method for providing security to a DaaS platform.

The expansion of Cloud Computing, where computing resources are provided on demand to the user, has allowed providers to offer different services to groups of users. Examples of these include Infrastructure-as-a-Service (IaaS), Platform-as-a-Service (PaaS), Software-as-a-Service (SaaS), and more recently, Data-as-a-Service (DaaS).

A Data-as-a-Service platform provides access to data sets, i.e., databases and files, through a remote access. In such a system, there are one or several data providers, who publish and control the data on the platform, and one or several data consumers, who can query, download and use the data. Like the other "as a service" offerings, DaaS relies on dedicated platforms that do not need to be located near the place where the data is actually used and which are accessed through web services, mashups (web application hybrids), mobile applications, and the like. Such platforms are not typically operated by the owners of the data.

The DaaS solution offers many benefits to data users and providers. For data providers, it brings flexibility and cost effectiveness without the need for upfront investment. Providers do not need to buy and maintain dedicated hardware or software, since a simple subscription service provides all the resources needed, for example, with a service level agreement. The resources are usually made available within a few minutes, depending on the solution provider. The subscription can be stopped at any time, since it is generally a pay-per-use model. For data consumers, the DaaS solution also makes the use of the system much easier by providing a uniform and well-documented API (as it is standardized across all providers) and generally by providing a better quality of service as compared to private servers. Another benefit for both data consumers and providers is often better security and a more standardized configuration over the platform, since public cloud systems are much more visible and susceptible to unauthorized access.

However, there are some disadvantages with DaaS platforms. For example, even though the security aspects have been addressed in part, most DaaS services lack the means to address data privacy and security solutions over the stored data sets. As a result, an attack could result in the disclosure of data and the users' privacy being compromised. This creates a problem of trust. When using a DaaS, the user's data resides on the computer infrastructure of the platform provider. While the provider may implement security measures to provide data privacy, this can come at a cost. One issue is therefore how much privacy is sufficient. The provider may need to consider protection against external attacks and also internal attacks coming for the service provider's employees or others with access to the user's data. Thus, depending on the level of trust that the user has in the platform, there may be a need for demonstrating that the service provider is protecting the data and user's privacy against the service provider itself.

The level of the trust that a user has in a system has an impact on the way that the security architecture of a platform is designed. Currently, computing platforms are classified, in terms of trust, in two ways: trusted and non-trusted. A "trusted system" is a system that is relied upon to a specified extent to enforce a specified security policy. The user, in turn, trusts the service to handle the security aspect properly. A trusted DaaS platform may provide confidentiality and privacy of the data by implementing encryption solutions in which an encryption key resides on and is managed by the platform. This kind of system simplifies the user experience, as the user does not need to handle the complications of key management, encryption mechanisms, and so forth. However, there is still the risk that administrators of the platform, as well as attackers who gain administrator privileges, may be able to access the user's data and decrypt it. A "non-trusted system" is one where the user does not trust the service to handle the data privacy and security properly, and thus the user implements a desired privacy mechanism, e.g., by encrypting the data before it is sent to the system. In this situation, it is up to the user to manage the encryption keys (generation, storage and sharing). While this solution generally provides the best privacy from the user perspective, it is also much more complicated to implement as the users need to have a good security knowledge. Moreover, while are already many DaaS vendors, few of them provide cryptographic solutions to users.

As an example, one cloud solution provider of data storage services, Amazon, offers two solutions for data encryption: Server Side Encryption and Client Side Encryption. In the former, the company handles both the key management and the cryptographic mechanisms (trusted platform), while in the second, it only provides storage for encrypted data, and it is up to the end-user to manage keys and implement cryptographic procedures (non-trusted platform). Another service offered is a Relational Database Service, which provides an SQL storage platform. In this option, data can be stored in plaintext or in ciphered form using Oracle Transparent Data Encryption. The Oracle engine encrypts the entire database files on disk (a trusted platform). However, there is no option for single column encryption. Microsoft is another DaaS solution provider. Its SQL Azure platform does not currently support encryption and decryption of the data at the database level (a non-trusted platform). Another platform provider, CipherCloud, provides access to non-trusted DaaS providers via a cryptographic gateway. The gateway provides the cryptographic mechanisms while the key management is performed locally on the client side. This solution provides some assistance to users in handling the cryptographic complications that clients face in using non-trusted platforms.

The trust that providers of the data have in authorized users is another consideration. There is a risk that data consumers may handle the data in an unauthorized manner, such as by distributing the data publicly. Various solutions have been proposed for watermarking and fingerprinting of databases. In such techniques, database rows are chosen sequentially or are grouped or partitioned. Then, the fingerprint or watermark string is hidden in attributes of those rows where their data type is String, Integer or Date. See, for example, Odeh, et al., "Watermarking relational database systems," First International Conf. on the Applications of Digital Information and Web Technologies (ICADIWT 2008), pp. 270-274 (August 2008); Hanyurwimfura, et al., "Text format based relational database watermarking for non-numeric data," Intern'l Conf. on Computer Design and Applications (ICCDA), vol. 4, pp. 312-316 (2010); Zhang, et al., "Relational databases watermarking for textual and numerical data," Intern'l Conf. on Mechatronic Science, Electric Engineering and Computer (MEC), pp. 1633-1636 (2011). However, adapting such techniques to the DaaS platform automatically is challenging, since the platform is generally composed of various databases with different data type structures.

There remains a need for a system and method which provides users with a level of assurance that their data will not be misused without the complexities of existing systems.

INCORPORATION BY REFERENCE

U.S. Patent Publication No. 20130191650, published Jul. 25, 2013, by Hari Balakrishnan et al., entitled "METHODS AND APPARATUS FOR SECURING A DATABASE";

U.S. patent application Ser. No. 14/107,477, filed Dec. 17, 2013, by Jean-Luc Meunier et al., entitled "PRIVACY-PRESERVING EVIDENCE IN ALPR APPLICATIONS";

U.S. patent application Ser. No. 14/255,252, filed Apr. 17, 2014, by Estehghari et al., entitled "Semi-Trusted Data-as-a-Service Platform";

Agrawal et al., "Watermarking Relational Databases", IBM Almaden Research Center, Proceedings of the 28th VLDB Conference, Hong Kong, China 2002, 12 pages;

Guo et al., "Fingerprinting Relational Databases", SAC'06, Apr. 23-27, 2006, Dijon, France, pages 487-492;

Hanyurwimfura et al., "Text Format Based Relational Database Watermarking for Non-numeric Data", 2010 International Conference on Computer Design and Applications (ICCDA 2010), Volume 4, pages V4-312 to V4-316;

Lafaye et al., "Watermill: An Optimized Fingerprinting System for Databases Under Constraints", IEEE Transactions on Knowledge and Data Engineering, Vol. 20, No. 4, April 2008, pages 1-15;

Li et al., "Fingerprinting Relational Databases: Schemes and Specialties", IEEE Transactions on Dependable and Secure Computing, Vol. 2, No. 1, January 2005, pages 34-45;

ODEH et al., "Watermarking Relational Database Systems", 2008 IEEE, pages 270-274;

ZHANG et al., "Relational Databases Watermarking for Textual and Numerical Data", 2011 International Conference on Mechatronic Science, Electric Engineering and Computer, Aug. 19-22, 2011, Jilin, China, 2011 IEEE, pages 1633-1636; and "Levenshtein Distance", en.wikipedia.org/wiki/Levenshtein_distance, printed Aug. 1, 2014, 7 pages, are incorporated herein by reference in their entirety.

BRIEF DESCRIPTION

In one embodiment of this disclosure, described is a computer-implemented method of fingerprinting a relational database with a unique identifier associated with a user of the relational database, the relational database including a plurality of rows associated with a plurality of tuples, a plurality of attribute columns associated with each row, a plurality of unique primary keys wherein each primary key is associated with a unique row, and a plurality of attributes wherein each attribute is associated with a tuple and a respective attribute column, the method comprising: a) generating a fingerprint bit string including a data user identification code and a secret key (k) unknown to the user and unique to the relational database; and b) embedding the fingerprint bit string in the relational database by modifying a plurality of pseudorandomly selected attribute values in a plurality of respective rows, the pseudorandomly selected attribute values associated with one or more columns determined by an originator of the relational database to be tolerant of modifications.

In another embodiment of this disclosure, described is a system for fingerprinting a relational database with a unique identifier associated with a user of the relational database, the relational database including a plurality of rows associated with a plurality of tuples, a plurality of attribute columns associated with each row, a plurality of unique primary keys wherein each primary key is associated with a unique row, and a plurality of attributes wherein each attribute is associated with a tuple and a respective attribute column, the system comprising: a fingerprinting component configured to generate a fingerprint bit string including a data user identification code and a secret key (k) unknown to the user and unique to the relational database; and an embedding component configured to embed the fingerprint bit string in the relational database by modifying a plurality of pseudorandomly selected attribute values in a plurality of respective rows, the pseudorandomly selected attribute values associated with one or more columns determined by an originator of the relational database to be tolerant of modifications.

In still another embodiment of this disclosure, described is a computer-implemented method of detecting an embedded fingerprint in a relational database, the embedded fingerprint including a plurality of modified pseudorandomly selected attribute values in a plurality of rows associated with the relational database, the method comprising: a) receiving a relational database including the embedded fingerprint and a plurality of unique primary keys associated with the plurality of rows; b) determining which rows include the embedded fingerprint using a pseudorandom function seeded with the unique primary keys; c) determining a fingerprint bit index for each row determined to include the embedded fingerprint, the fingerprint bit index providing a sequence of modified attributes associated with a row representing the embedded fingerprint; d) retrieving a plurality of bits from a plurality of rows based on the fingerprint bit index indicated modified attributes; and e) calculating the embedded fingerprint by compiling the retrieved plurality of bits to provide a fingerprint bit string representing a unique user of the relational database and a secret key.

DETAILED DESCRIPTION

Figure 1:
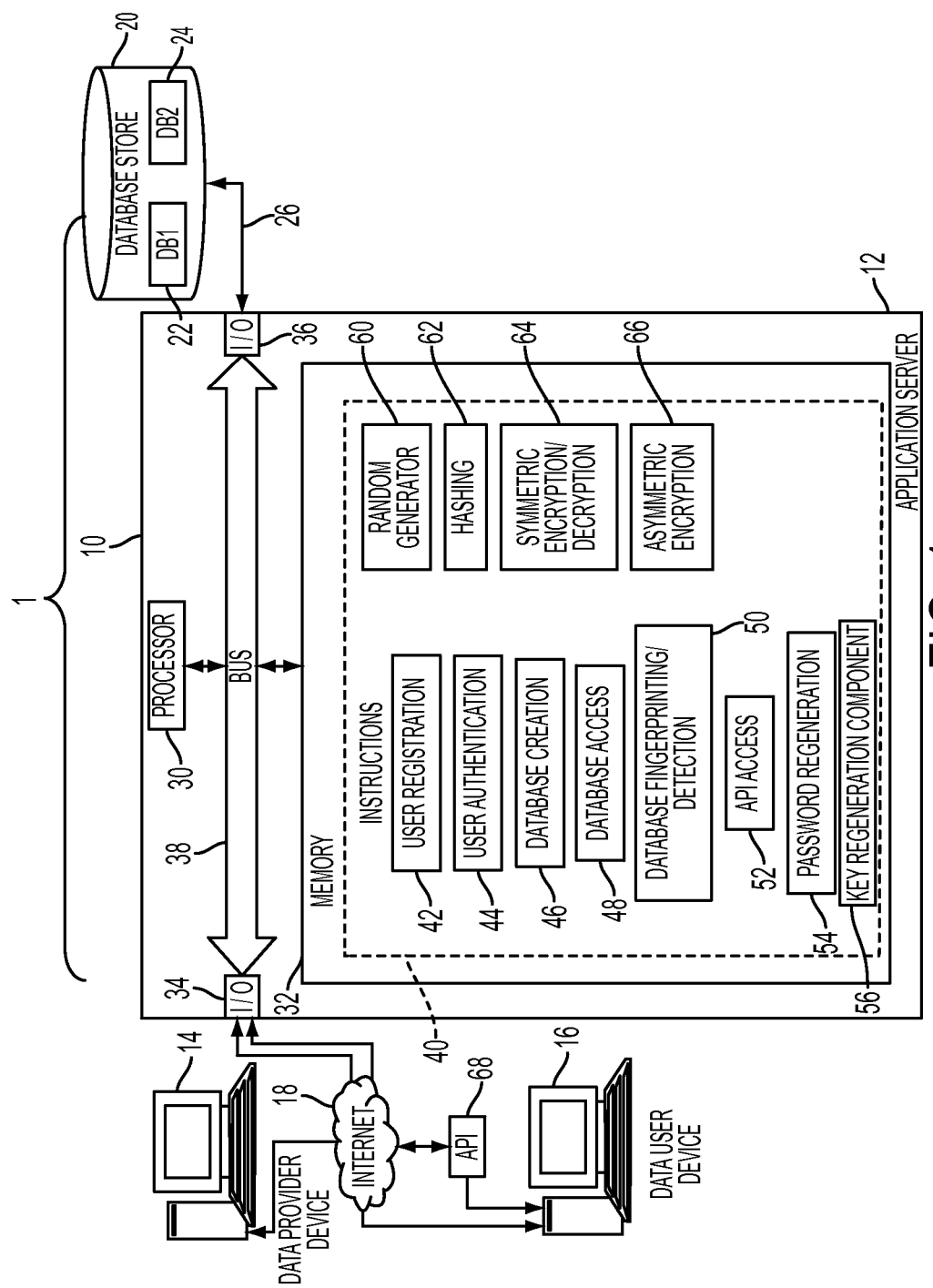
FIG. 1 is a functional block diagram of an environment in which a semi-trusted data encryption system operates in accordance with one aspect of the exemplary embodiment.

Aspects of the exemplary embodiment relate to a system and method for providing semi-trusted security mechanisms that are offered and enforced at the level of a data exchange platform, such as a Data-as-a-Service (DaaS) platform. With such mechanisms, users can exchange confidential data without trusting the platform, but also without managing the complex security protocols themselves.

Furthermore, this disclosure provides a method and system to embed and hide data user identification in a relational database by using fingerprint methods. The disclosed approach provides the opportunity to 1) hide a fingerprint in larger data type than date, string and integer by providing methods for float, double, decimal and geographic location; 2) choose fingerprint indexes according to a primary key, which makes the detection of a fingerprint more flexible since it is based on the identification of the row; and 3) increase the probability to encode and find back the full fingerprint even in a small dataset, by controlling the fingerprint bit selection and by allowing multi hideout attributes/columns.

Initially described is a Data as a Service (DaaS) platform featured with the state of the art cryptography solutions to address trust and privacy issues as disclosed in U.S. patent application Ser. No. 14/255,252, field Apr. 17, 2014, by Estehghari, entitled "SEMI-TRUSTED DATA-AS-A-SERVER PLATFORM." Then, a description is provided to detail database fingerprinting mechanisms. However, it should be noted that the fingerprinting mechanisms described have much broader applications than merely a DaaS platform as initially described. In other words, the fingerprinting mechanisms described can be applied to any database that may be shared, distributed or sold, whether it is hosted by a DaaS platform or not.

Users of the system include data providers (owners) and data users (customers). Some or all of the users may be both owners and customers.

The semi-trusted system and method can be considered as being intermediate trusted and non-trusted systems. A semi-trusted platform is one where users do not need to implement complex cryptography schemes and to manage the encryption keys as in non-trusted ones, and where the data privacy is protected from legitimate or malicious administrators, as in trusted platforms. In the exemplary system, the platform is allowed to access and process the user data whenever the user is online and gives permission to the system. Except for such permitted uses and times, the data remains confidential and protected from unauthorized use by service providers and administrators.

The database created and any updates are encrypted with a database key that is decrypted from a user key that is based on the database provider's password. An encrypted database key is then generated by the platform for each of a set of trusted consumers. This asymmetric mechanism ensures that the platform and administrative operators will not gain access to the clear (unencrypted) content of the database. The database key and each user's user key, which is used for decryption of database key from the stored encrypted database key, are inaccessible to the system between user sessions.

One reason for using a DaaS platform is that data needs to be shared among various parties, i.e., data providers and data consumers. In such a system, the data consumers may be allowed to access the data and export it to their own computing devices. However there is always the risk that such data may be leaked or distributed by the user. Trust may thus become an issue for the data owners. Distributing the ciphered data is not a useful option nor is it useful to prohibit distributing the data at all. A supplementary mechanism of fingerprinting is optionally provided in order to mark the accessed records with the requester identity. Thus, the originator of a data leak may then be traced from such records. Fingerprinting is a class of information hiding techniques that insert digital marks into data with the purpose of identifying the recipients who have been provided data. See, Yingjiu Li, et al., "Fingerprinting Relational Databases: Schemes and Specialties," IEEE Trans. Dependable Secur. Comput. 2, 1, pp. 34-45 (January 2005), hereinafter, Li 2005. As a result, this mechanism gives the ability to the data providers to identify who was at the origin of the data distribution, i.e., which authorized data consumer actually leaked the data to unauthorized parties, and the ability to take appropriate actions. The data fingerprinting solution can thus fill the gap of trust between the different actors. First, the data owners are assured that they will be able to identify data leakers. Second, the consumers may become reluctant to distribute the data, as the users know that they can be traced.

The hashing performed in the exemplary methods discussed below generates a hash value (or "hash") based on at least one (generally, at least two or more) pieces of information. Given the hash value, the original piece(s) of information cannot be reconstructed (at least not without undue computational expense and a significant number of examples of such data). Where two or more pieces of information are used to form a hash, these are first combined, e.g., concatenated, in a predefined order.

The encryption keys used herein convert the information to binary data that can be represented as a string. The string can be decrypted to regenerate the original information with the same key, in the case of symmetric encryption, or with a different key, in the case of asymmetric encryption. In asymmetric encryption, two separate keys are employed: a secret (or private) key is used to decrypt data which has been encrypted or to create a digital signature, and a public key, which is mathematically linked to the secret key. The public key can be used to encrypt plain text or to verify the digital signature but is not able to decrypt the data.

With reference to FIG. 1, a functional block diagram of an environment in which a DaaS platform 1 operates is shown. The platform includes a computer-implemented system 10, which is configured to offer a DaaS service to clients who want to access, publish and share their data in a secure manner. The system 10 is designed to operate in a semi-trusted way, in which the privacy and the confidentiality of the data is preserved until the user, by being online, gives the permission to the system to access the data. In some embodiments of the system, the owners of the data may not have a high trust in the users of the data. In this embodiment, a data fingerprinting option is offered to the owners of the data, enabling them to track their data and identify unauthorized distributers.

The computer system 10 is hosted by an application server 12, which is capable of interacting with data providers and customers, operating respective client computing devices 14, 16, via wired or wireless network 18, such as the Internet. The server hosts or has access to a database store 20 which hosts encrypted databases 22, 24, etc., which have been uploaded by various providers. Where the database is hosted by one or more remote computing devices, access from the server 12 is via a secure link 26, to which database users generally have no direct access. The database store 20 and application server 12 form the DaaS platform 1 in the illustrated embodiment.

The illustrated computer system 10 includes a processor 30, which controls the overall operation of the computer system 10 by execution of processing instructions which are stored in memory 32 connected to the processor 30. Computer system 10 also includes one or more input/output interfaces 34, 36 for communication with external devices 14, 16, and database store 20. The various hardware components 30, 32, 34, 36 of the computer 12 may be communicatively connected by a bus 38. The processor 30 executes instructions for performing at least part of the method outlined in FIGS. 3-13.

Memory 32 stores instructions 40 for performing the exemplary method and optionally for performing other conventional operations of a DaaS platform. In particular, the system hosts a user registration component 42, a user authentication component 44, a database creation component 46, a database access component 48, a database fingerprinting and detection component 50, an application programming interface (API) access component 52, a password regeneration component 54, and a key regeneration component 56 which generates a password encryption and decryption key based on the answers to the security questions. Some of these components are optional, as described below. These components may incorporate or make use of various encryption services, such as a random number generator 60, a hashing service 62, a symmetric encryption/decryption service 64, and an asymmetric encryption service 66. These components are best understood with respect to the method below.

The computer system 10 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 32 may represent any type of non-transitory computer readable medium such as random access memory (RAM), read only memory (ROM), magnetic disk or tape, optical disk, flash memory, or holographic memory. In one embodiment, the memory 32 comprises a combination of random access memory and read only memory. In some embodiments, the processor 30 and memory 32 may be combined in a single chip.

The network interface(s) 34, 36 allow(s) the computer to communicate with other devices via a computer network, such as a local area network (LAN) or wide area network (WAN), or the Internet, and may comprise a modulator/demodulator (MODEM) a router, a cable, and and/or Ethernet port.

The digital processor 30 can be variously embodied, such as by a single-core processor, a dual-core processor (or more generally by a multiple-core processor), a digital processor and cooperating math coprocessor, a digital controller, or the like. The digital processor 30, in addition to controlling the operation of the computer 12, executes instructions stored in memory 32 for performing the method outlined in FIGS. 2-12.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
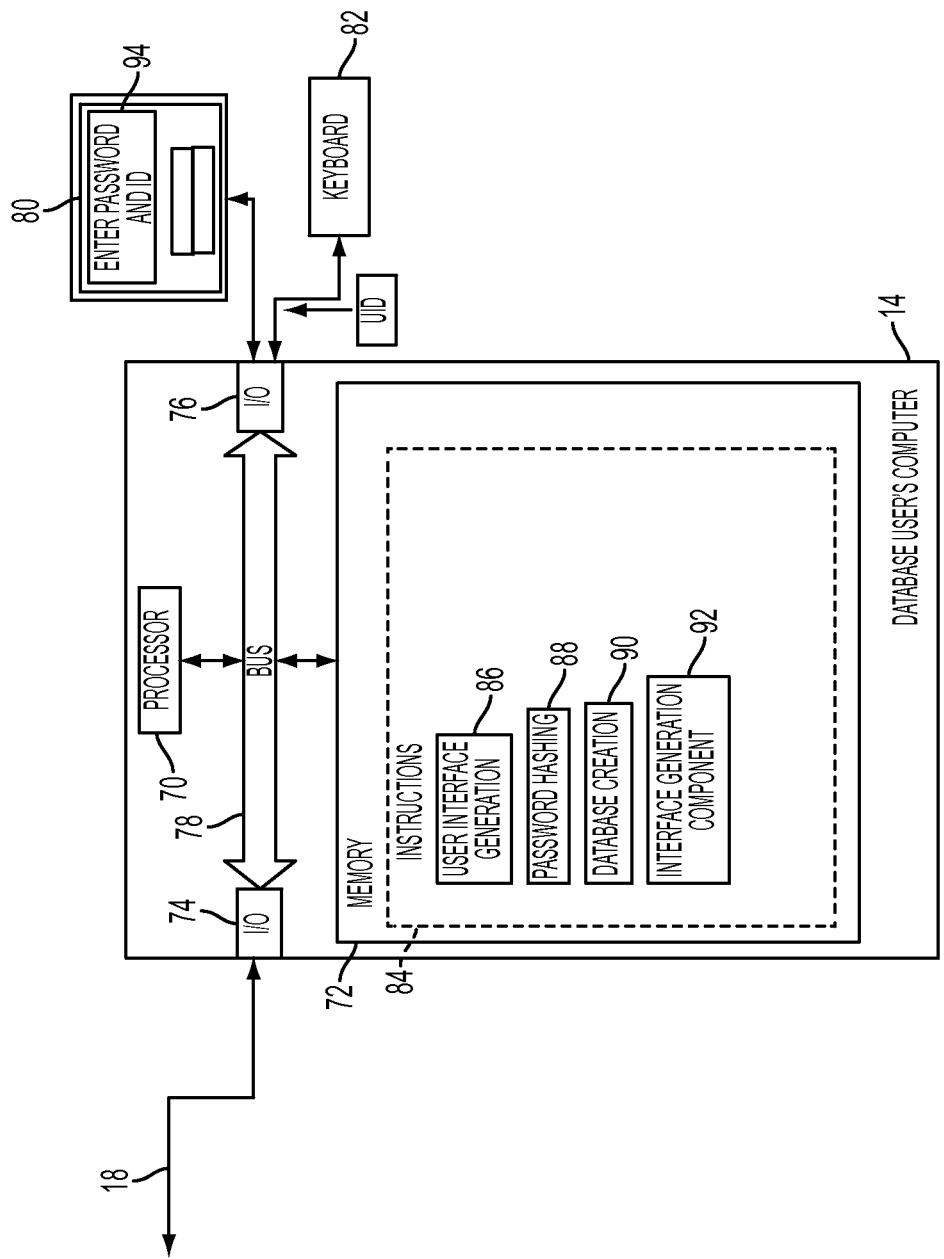
FIG. 2 is a functional block diagram of a database user's computer according to an exemplary embodiment of this disclosure.

As illustrated in FIG. 2, each user device 14, 16 includes a processor 70, memory 72, input output devices 74, 76, and bus 78 analogous to device 12. An associated user interface includes a display device 80, such as an LCD screen or computer monitor, and a user input device 82, such as a keyboard, keypad, touchscreen or the like for entering commands which are received by the processor 70. Memory 72 stores instructions 84 for interacting with system 10 including a user interface generation component 86, which generates a user interface for interacting with the server, a password hashing component 88, a database creation component 90, and an interface generation component 92 for generating an interface 94 on the display for receiving the user's password and selection of answers to security questions. Hardware components 70, 72, 74, 76 of the user devices 14, 16 may be similarly configured to those of the application server 12, except as noted.

Figure 3:
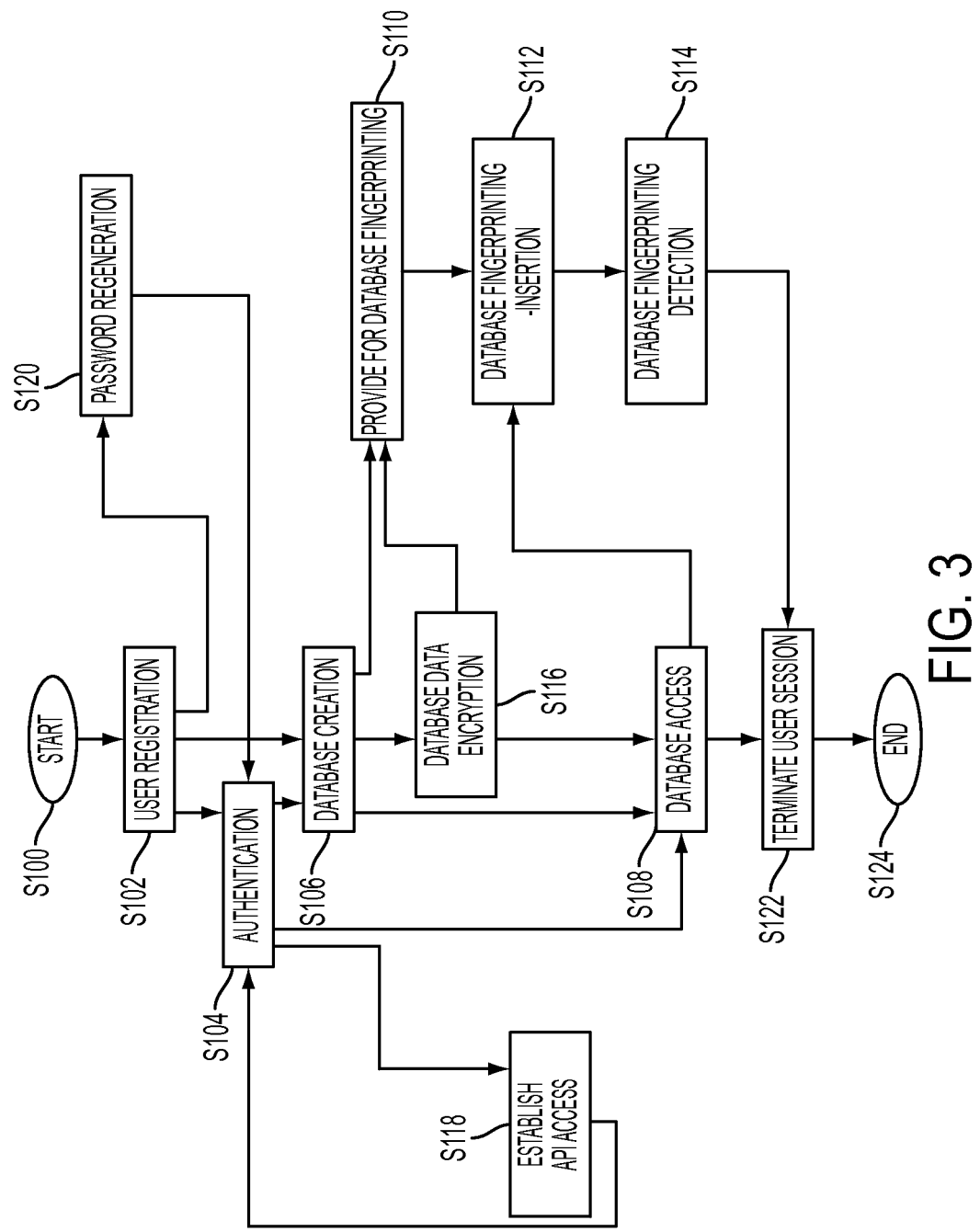
FIG. 3 is a flowchart illustrating a semi-trusted data encryption method in accordance with another aspect of the exemplary embodiment.

FIG. 3 provides an overview of the exemplary method for shared access of a database in a semi-trusted manner, specific embodiments of which are described with reference to FIGS. 4-13. The method begins at S100.

At S102, a new user, operating on a client device 14, 16, establishes a communication link with the server and registers with the system 10 by providing a (hashed) password and a user ID via the user interface 94. These are used by the registration component 42 to create a user key, which is encoded by the system with a one-way function. Optionally, a pair of PKI keys is randomly generated, if the user wishes to have access to the databases of other users. Registration is described in further detail with reference to FIG. 4. The method can then proceed to any one of steps S104 to S110 or S114-S122, depending on the purpose of the user session.

At each subsequent log on to the system (S104), the user undergoes an authentication process by resubmitting the hashed password, which is used by the authentication component 44 to regenerate the user key which is encoded and checked to see if it matches the previously stored encoded user key. Authentication is described in further detail with reference to FIG. 5.

At S106, a database may be created. In particular, a user who wishes to store a database in the store 20 submits the database 20, 22 (or data for its creation) to the system (after authentication, as described above). The database is received by the database creation component 46 of the system and stored in encrypted form in database store 20. A database key is created which is specific to that database and encrypted, by the database creation component 46, using the user's key. Database creation is described in further detail with reference to FIG. 6.

At S108, provision is made for a customer to access a previously created database 22. A user (customer) who wishes to access a database 22, does so by authentication (as for (S104)), with the regenerated user key thereafter being used by the database access component 48 to decrypt the encrypted database key (provided the customer has been granted access). The database key is then used to decrypt the database 22 temporarily for that user. The accessed database 22 is returned to its encrypted state (any unencrypted data generated during the user session being deleted from system memory) by the time the user ends the session (logs off the system and/or the client device 14, 16, 68 is no longer in communication with the server 12). Database access is described in further detail with reference to FIG. 7.

In some embodiments, the database creator wishes to provide for subsequent generation of a fingerprint which is unique to each user who accesses the database. At S110, which can be part of S106, the user identifies, to the fingerprinting component 50, those fields of the data in which the data can be modified to provide a fingerprint. Subsequently, at S112, which can be part of S110, a fingerprint unique to the user is inserted in the specified fields of the database data before a customer is permitted access, as described in further detail with reference to FIG. 8. At S114, if a data provider later provides evidence that the data has been disclosed, the customer who caused the disclosure can be identified from the unique fingerprint hidden in the data, as described in further detail with reference to FIG. 9.

In some embodiments, the database creator wishes to encrypt part of the data, which is performed at S116 by the database creation component 46, as described in further detail with reference to FIG. 10. Database data encryption encrypts some or all of the database data such that when the database is accessed by a customer authorized to have access the database, the data itself remains encrypted.

In some embodiments, a database user wishes to access a database via an API 68. In this embodiment, the API access component 52 provides a mechanism by which this is achieved through issuing, to the user, a token, a certificate which enables a limited time access, and a secret access key (S118), which can be provided to the API 68 for subsequent authentication and access to the database. The process of API access and refreshing the limited time certificate is described in further detail with reference to FIGS. 11-13.

In some embodiments, a user may wish to access the database but has lost the password. Access may be provided for by the password regeneration component 54, through a password regeneration method (S120), as described in further detail below.

At S122, the user session is terminated and the information which was temporarily stored on the platform is deleted, if this has not been done already. It is to be noted that the user key, as well as the hashed password from the user (or other user input in the case of an API) which was used to generate/regenerate the user key, and any database keys generated from it, as well as any decrypted database data, are all deleted from platform memory so that this information no longer exists in memory accessible to the system after the session ends. Any storage of this information during the user session is only temporary. Thus, neither the user device 14, 16, nor the system 10 stores the user key or database key permanently. The databases 22, 24, etc. thereafter remain inaccessible, i.e., encrypted, until the same or another user logs on, directly or indirectly via an API, and properly authenticates with the appropriate user input.

The method ends at S124.

As will be appreciated, the steps of the method need not all proceed in the order illustrated and fewer, more, or different steps may be performed.

Further details of the system and method will now be described. The following notation is used in the description:

KU—Key of a user
KD—Key of a database
KD'—Encrypted key of the database
PKU, SKU—public and secret key pair for a user
KM—Key for fingerprinting
KP—Key of the platform
K—Key for KM encryption
FP—Fingerprint Privacy, Confidentiality and Secure Data Sharing:

In the exemplary platform, the confidentiality of the data is provided by using one or more cryptography algorithms. The data is encrypted while at rest and it is only decrypted and becomes available when the user is online and wants to access it. All communications are made over a secure channel. In the exemplary embodiment, the system provides for privacy, confidentiality, and secure data sharing.

The key management process is primarily performed on the server side and the complications that would ensue are avoided on the client-side. However, as this is a semi-trusted system, it does not have direct access to keys used for encryption/decryption. This means that the privacy of the user is preserved while the user is offline.

1. Privacy of Users: Each user of the system 10 is associated with a password P, which may be selected at user registration time (S102). The user password is hashed and the hashed password HP is used to generate a key KU for the user. The user key is used to encrypt the data that corresponds to the user. However the user key is never saved on the server and it is recalculated at each user's login.

2. Confidentiality of data: For each encrypted database 22, 24 that is created through the system, a database key KD is randomly generated which can be used to encrypt the data that is stored in it. The key KD for accessing such data is shared among authorized users and can be encrypted with the KU of each of the users.

3. Secure Sharing of the data: The authorized users may not be online at the time of the key sharing. When they are not online, the system 10 does not have access to their user key KU. To address this, a pair of PKI public and secret (private) keys PKU, SKU is generated for each user at registration time, where the public key PKU is to be publicly available to the system and the secret key SKU is encrypted with the KU. At the key sharing time, the owner of the database specifies the authorized users and the system then encrypts the database's key KD with each authorized user's public key. At each user's login, the system can gain access to their KU and consequently their secret key, which then can be used to decrypt the database key KD and the user is able to access the encrypted data. The database key KD can then be encrypted with the user's key KU to avoid the need to continue with an asymmetric encryption (which is slower than symmetric algorithms).

4. Fingerprinting: As noted above, adapting conventional fingerprinting techniques to DaaS is challenging, since the platform is composed of various databases with different data type structures. The fingerprinting technique can be instantiated with different fingerprinting algorithms, since the data types might change from database to database. This makes the mechanism more dynamic.

In spite of the trust that the database owner has over the authorized users, the owner may decide to use a fingerprinting mechanism to be able to track and identify malicious distributors. Using this option is independent of the encrypted database.

The database owner may decide which columns of his database can be modified. This generally is done manually rather than being automated, as a column containing integers, for example, should not be modified if it contains unique identifiers, but may be slightly modified if it contains large, approximate numbers (e.g., number of page loads of a web site). For fingerprinting the database, an algorithm may be chosen based on the chosen columns' data types.

For fingerprinting, a new random fingerprinting key KM may be generated for each database. The random key KM is encrypted using a key that is derived from the key KU of the owner and the key of the system (KP). The fingerprint FP is generated using this key and the user's ID (only the authorized users). The fingerprinting key is never stored on the server. It is unique for each user of a database and it is different for the same user from database to database. The fingerprint that is supported in such a platform is generated and inserted into data dynamically at each user access.

The owner of a database, who finds that an extract of his database has been made public, for example, can use the platform to identify the distributor of the database.

Further details of the method will now be described.

A. User Registration (S102)

Figure 4:
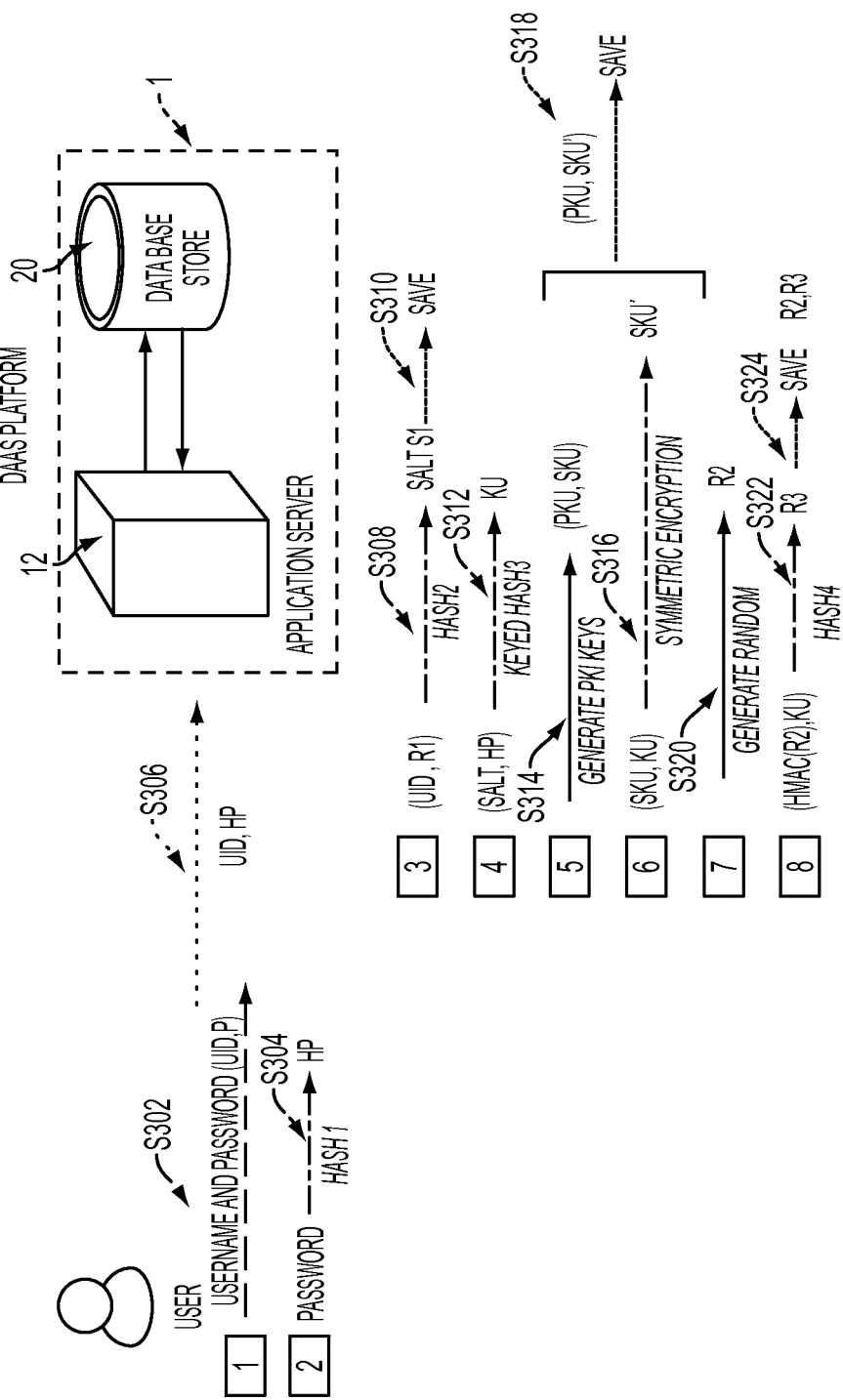
FIG. 4 is a flow chart illustrating registration of a user in the method of FIG. 3.

With reference to FIG. 4, the following process may be implemented at user registration time (S102). On the client side:

1. The user chooses a unique username UID and a password P, which is received by the client device (S302).
2. The password is hashed on the client device (S304) using a one way hash function Hash1 to generate a hashed password HP, which is sent with the UID to the server (S306). While a user could send the password in unhashed form, passwords are generally short and easy to remember, and are sometimes used by a user for multiple websites. The hashed password thus provides a unique password with added security.

On the server:

3. A salt S1 is generated (S308) by hashing a random string R1 and the UID with a hash function Hash2, and the salt S1 is saved to memory (S310).
4. A user key KU is generated from the salt S1 and the hashed password HP using a one way keyed hash function Hash3 (S312).
5. A pair of PKI keys is provided or generated (public key PKU, secret key SKU) (S314).
6. The secret key SKU is encrypted with the user key KU using a symmetric encryption method to generate an encrypted secret key (SKU') (S316). PKU and SKU' are saved to memory (S318).

In order to avoid the need for storage of the password (for authentication):

7. Another random string (R2) is generated (S320).
8. A keyed hash message authentication code (HMAC) R3 of the random string R2 and the user key KU is generated using a keyed hash function (Hash4) (S322) and R2 and R3 are saved (S324). The HMAC is a short piece of information used to authenticate the user key KU and to provide integrity and authenticity assurances.

B. User Authentication (S104)

Figure 5:
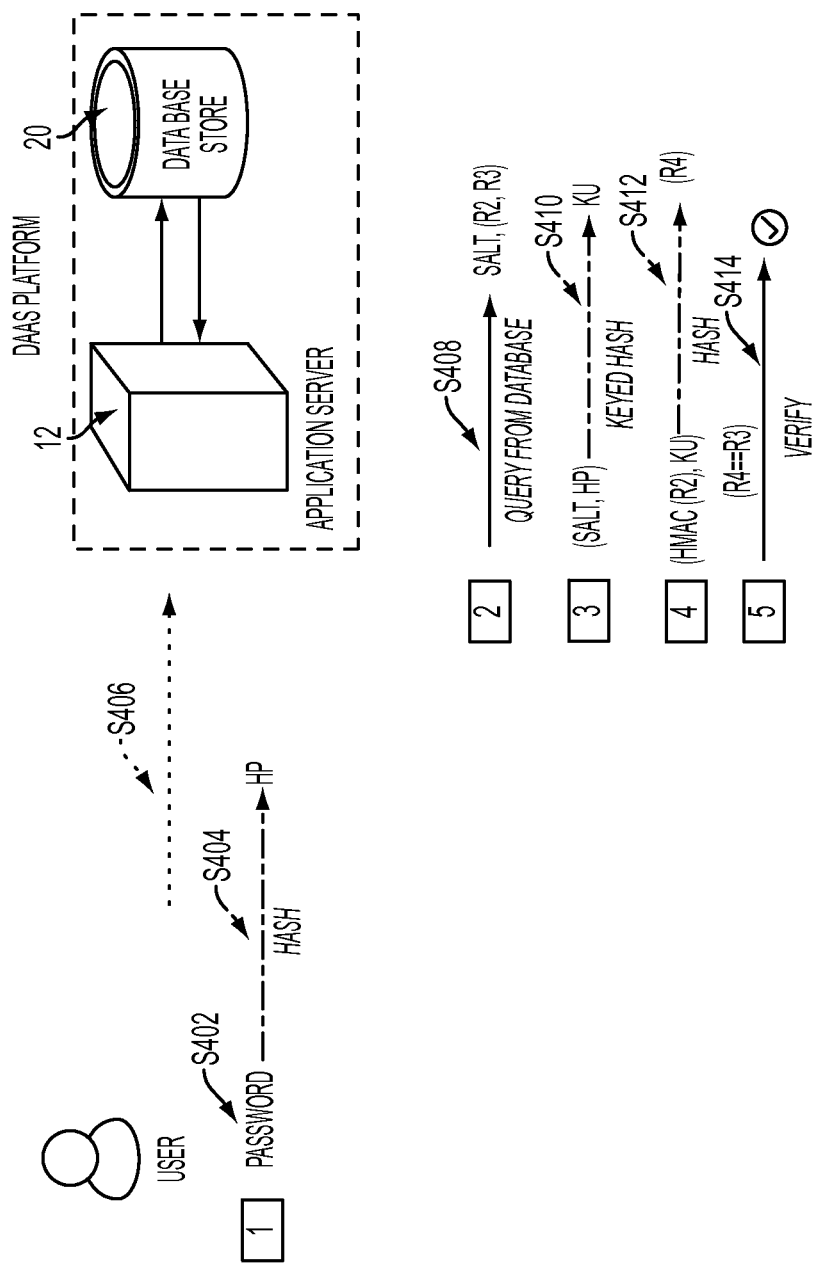
FIG. 5 is a flow chart illustrating user authentication in the method of FIG. 3.

With reference to FIG. 5, the following process may be implemented at authentication time:

On the client side:

1. The user reenters his password P on the client device (S402), and it is hashed (S404), as for S304, to generate HP, and HP is sent to the server (S406).

On the server:

2. The salt S1 together with the HMAC R3 and the random string R2 are retrieved from the database (S408).
3. The KU is calculated using a keyed hashed function based on the hashed password HP and the salt S1 (S410).
4. The HMAC of the random string R2 (R4) is calculated using a keyed hash function based on the KU (S412).
5. If the generated HMAC R4 equals the saved one R3, then the user is authenticated (S414).

C. Database Creation (S106)

Figure 6:
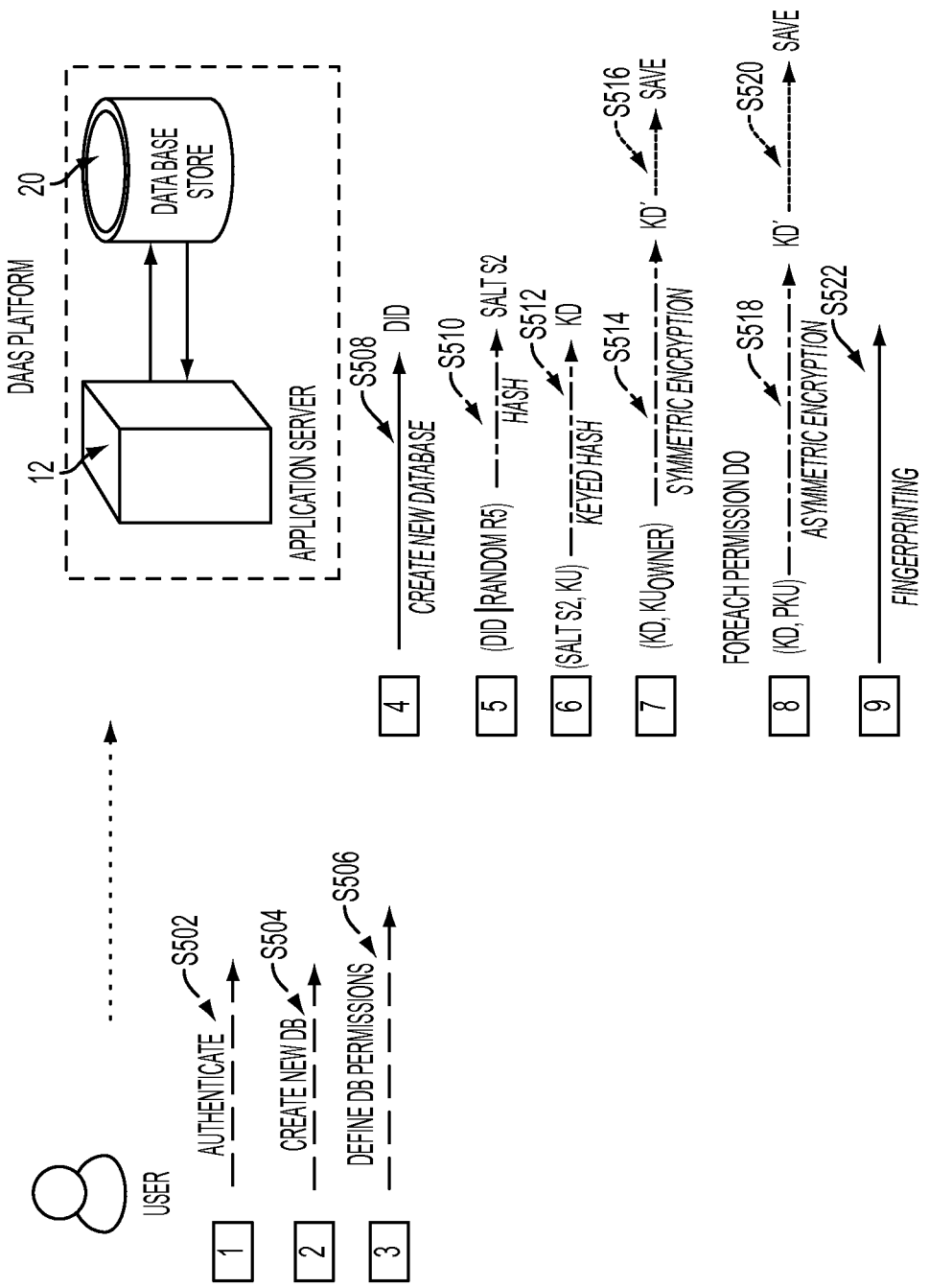
FIG. 6 is a flow chart illustrating database creation in the method of FIG. 3.

With reference to FIG. 6, the following process may be implemented at database creation. Each legitimate user of the platform can create a database and become the owner of the database. On each database creation the following steps are taken. On the client side:

1. The database owner is authenticated to the system (S502), as described above for user authentication S104.
2. The user makes a request to create a new database (S504).
3. The owner defines the permissions over the database (S506).

On the server:

4. A new database D with a database identifier DID is created (S508).
5. A salt S2 is generated based on a random string R5 and the database's ID DID using a one way hash function (S510).
6. Having the salt S2 and the KU of the owner, a database key KD is generated using a keyed hash function (S512).
7. The database key KD is symmetrically encrypted with the user key KU of the owner (S514) and the symmetrically encrypted database key KD' thus formed is saved in system memory (S516).
8. Then the database key KD can be shared with other authorized users by being encrypted with their respective public key PKU using an asymmetric encryption function to generate a respective shared, asymmetrically encrypted database (S518) key KD' that is unique to each user (S520), which is saved in system memory (S522).
9. Optionally, the owner may decide to activate the fingerprint option for this database (S522) as described below for S110, S112.

D. Database Access (S108)

Figure 7:
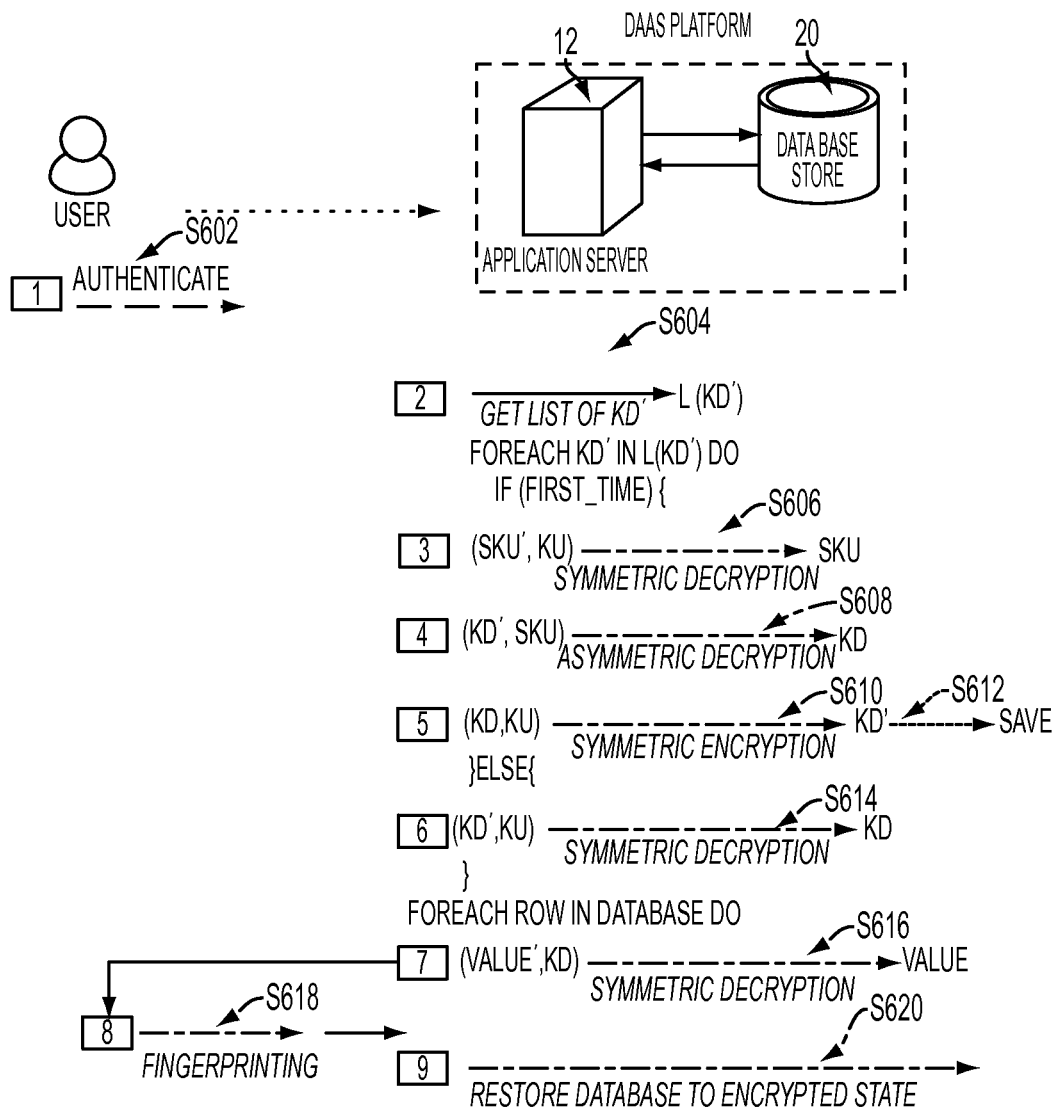
FIG. 7 is a flow chart illustrating database access in the method of FIG. 3.

With reference to FIG. 7, when a user wants to access a database for which the user has permissions, the following steps may be taken. On the client side:

1. The user is first authenticated with the system (S602), as described above for user authentication (S104), which regenerates the user's own user key KU. The user requests access to a particular encrypted database 22.

On the server:

2. The list of encrypted database keys KD' is obtained (S604). If the user has been authorized access, one of these keys will be able to be unencrypted, based on that user's user key KU and secret key SKU.

If it is the first time that the user accesses that database, the asymmetrically encrypted data base key is first asymmetrically decrypted then symmetrically encrypted, as follows:

3. The secret key SKU of the user is decrypted from the encrypted secret key SKU' using the user's regenerated user key KU (S606).
4. The encrypted KD is decrypted from the asymmetrically encrypted database key KD' using the secret key (S608).
5. The KD is then encrypted, using the KU (S610), and the symmetrically encrypted database key KD' thus generated is saved on the database (S612). In this way for the next access to the database a symmetric decryption function can be used.

If this is not the first access or the user is the owner of the database:

6. The KD is decrypted using the KU of the user and a symmetric decryption function (S614).

Following S612 or S614, the method proceeds to S616 (or S618), where:

7. The encrypted data in the selected database is decrypted for this session, where the user can then query the data, download it, and/or perform other authorized actions on the data (S616).
8. If fingerprinting has been used, further steps are included (S618) prior to user access, as described for FIG. 8.
9. The database is returned to its fully encrypted state (e.g., by deletion of any decrypted data deleted from system memory, and deleting the database key KD) (S620) so that the database data is no longer accessible to anyone once the user session ends (user logs off or communication with the user device otherwise ends) and remains inaccessible until the access process described above is repeated by the same or another user (either directly, or through an API, as described below).

E. Fingerprinting (S110, S112)

The database fingerprinting, if used, may include two separate steps: Insertion, as illustrated in FIG. 8 and Detection, as illustrated in FIG. 9.

i. Insertion (S110)

Figure 8:
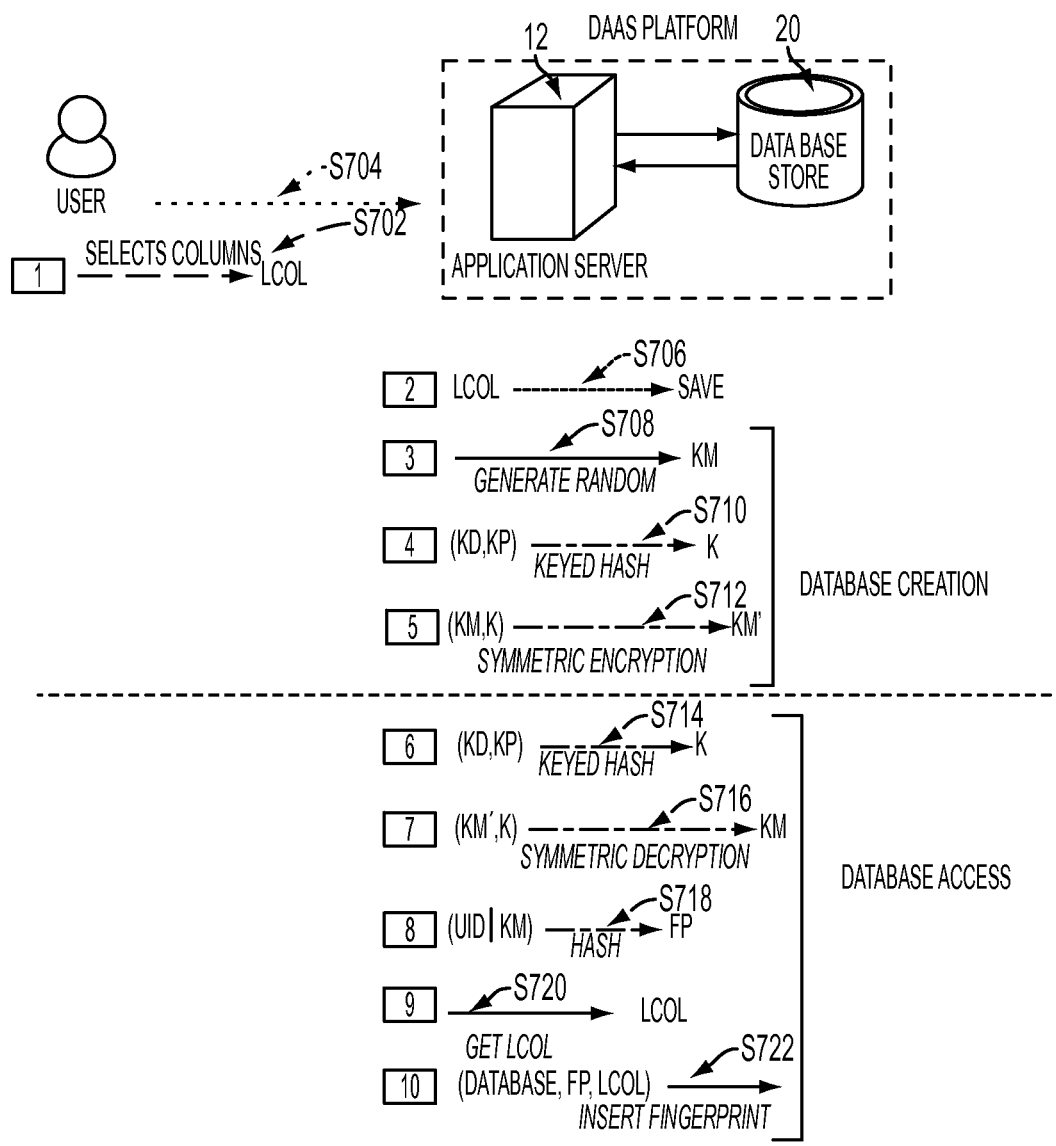
FIG. 8 is a flow chart illustrating database creation and access including fingerprinting in the method of FIGS. 3, 6 and 7.
Figure 9:
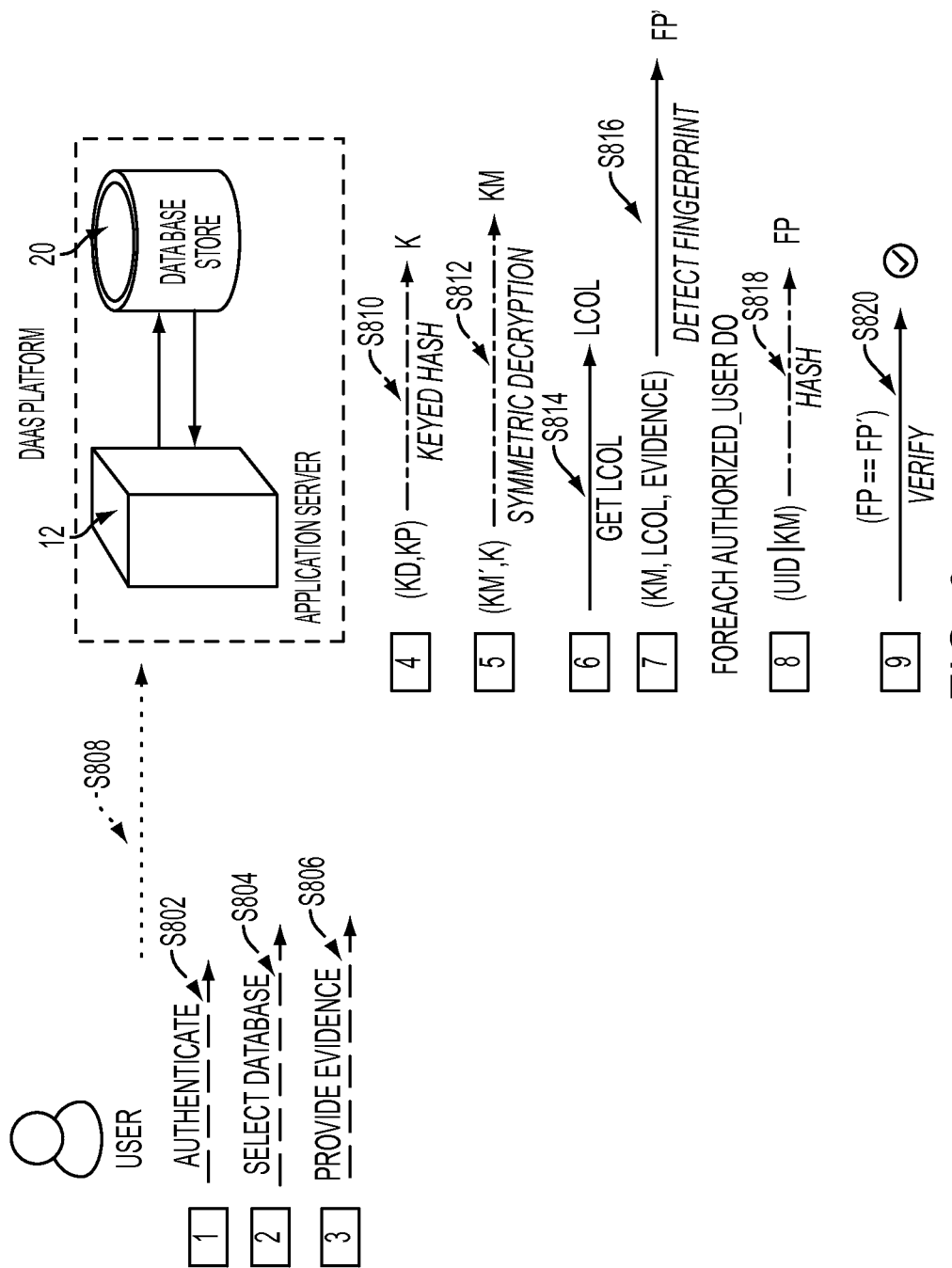
FIG. 9 is a flow chart illustrating detection of unauthorized access in the method of FIG. 3.

As illustrated in FIG. 8, at the database creation stage (S106), the database owner may decide to activate the fingerprint option for this database. In this case the following steps are added to the Database Creation (S106) and Database Access (S108) stages:

a. Database Creation

On the client side:

1. The database owner chooses the parts of the database data, e.g., database columns, whose values can be changed to accommodate part of the fingerprint (S702). These are received by the server (S704).

On the server:

2. The information on column(s) selected for the fingerprint is saved (S706).
3. A fingerprinting key KM, such as a random string, is generated for fingerprinting the database (S708).
4. A new encryption key K is generated, e.g., by hashing the database key KD and a key generated for the platform KP (S710).
5. The fingerprinting key KM is then encrypted using the KM encryption key K with a symmetric encryption function to generate an encrypted fingerprinting key KM' (S712).

b. Database Access

Database access is where the data is distributed to the user and as a result, it is the place where the fingerprint is embedded into the data (S618, FIG. 7) before being accessed. On the server:

6. The KM encryption key K is generated by hashing the database key KD (regenerated for this customer as described above) and the key of the platform KP (S714).
7. The fingerprinting key KM is then decrypted from the KM encryption key K (S716), using the symmetric encryption function used earlier in S712.
8. Based on the KM and the user ID UID, a fingerprint FP, which is unique to the user for that database, is generated using a hash function (S718).
9. The database's column selection for fingerprinting is queried (S720).
10. An encryption algorithm is chosen according to the columns' data type and the fingerprint is inserted in the data (S722).

ii. Detection (S112):

In this stage the owner of the database, who may have found the whole or a part of his database over the network, can identify the distributor of the data. To do this the following steps may be taken, as shown in FIG. 9. At the client side:

1. The owner authenticates, wherein the user key KU is recalculated (S802), as described above for S104.
2. The owner chooses the database D over which he wants to perform the detection (S804).
3. The owner also provides the evidence (S806), which is sent to the system (S808).

On the server:

4. The KM encryption key K is generated by hashing the regenerated database KD and platform key KP (S810).
5. The fingerprinting key KM is then decrypted (S812), by submitting the KM encryption key K to the symmetric encryption function used previously at S716.
6. The column selection for the chosen database is automatically queried (S814).
7. Using the fingerprinting key KM and the column selection, a detection algorithm is run over the provided data. As a result of this, a fingerprint detection string FP' is generated (S816).
8. A list of all authorized users for this database D is queried. For each user in the list, a fingerprint FP is generated using the fingerprinting key KM and the user's ID UID. Each FP is then compared to FP' (S818).
9. If there is a match between FP and FP', a malicious distribution of the data can be identified and reported to the owner with a matching fingerprint giving the identity of the user who accessed the data that was distributed without authorization (S820).

Other extensions to the exemplary system and method are also contemplated For example:

F. Import and Export of a Database

In the exemplary platform, the data can also be imported or exported in the form of a file.

i. Export

In this embodiment, an authorized user can export the databases for which he or she has authorization. For exporting the database, the same steps as described above for database access and fingerprinting sections are first taken.

ii. Import

Figure 10:
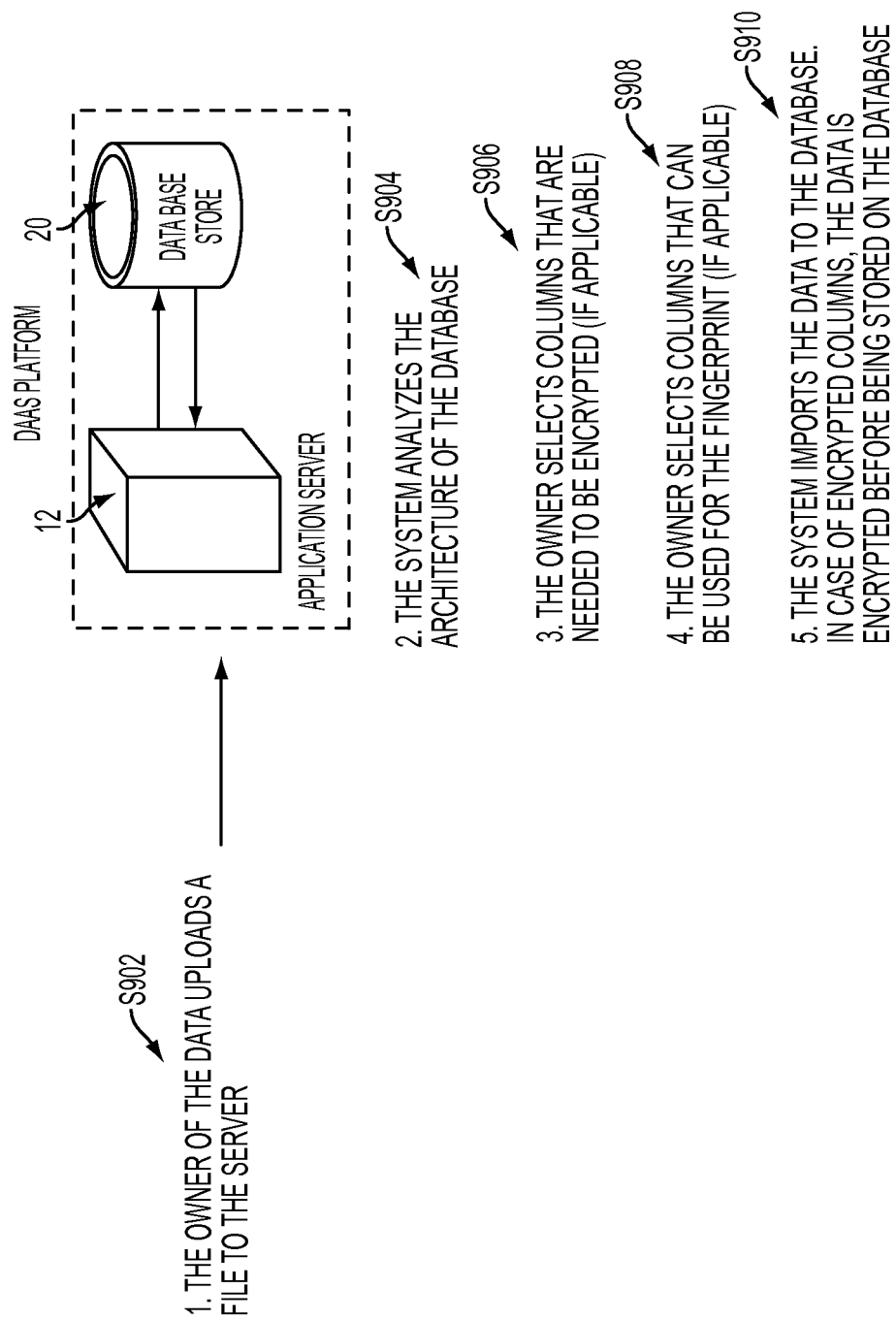
FIG. 10 is a flow chart illustrating database data upload in the method of FIG. 3.

The procedure for importing a database can be as for database creation (FIG. 5) with one or more additional step(s) as shown in FIG. 10. In importing a database, at the client side:

1. The owner of the data uploads a database file to the server (S902).

On the server:

2. The system analyzes the architecture of the database (S904).
3. The owner selects columns that are needed to be encrypted (if applicable) (S906).
4. The owner selects columns that can be used for the fingerprint (if applicable) (S908).
5. The system imports the data to the database store. In case of encrypted columns, the data is encrypted before being stored in the database store (S910).

G. API Access

Users may wish to access the data from their applications and services. This can be done by using an API (Application Programming Interface). This type of access is different from the website access described above. In the web interaction, it is assumed that the password is a secret and it is kept in the user's head. However, a password is a guessable string and should not be hard coded inside the applications.

Figure 11:
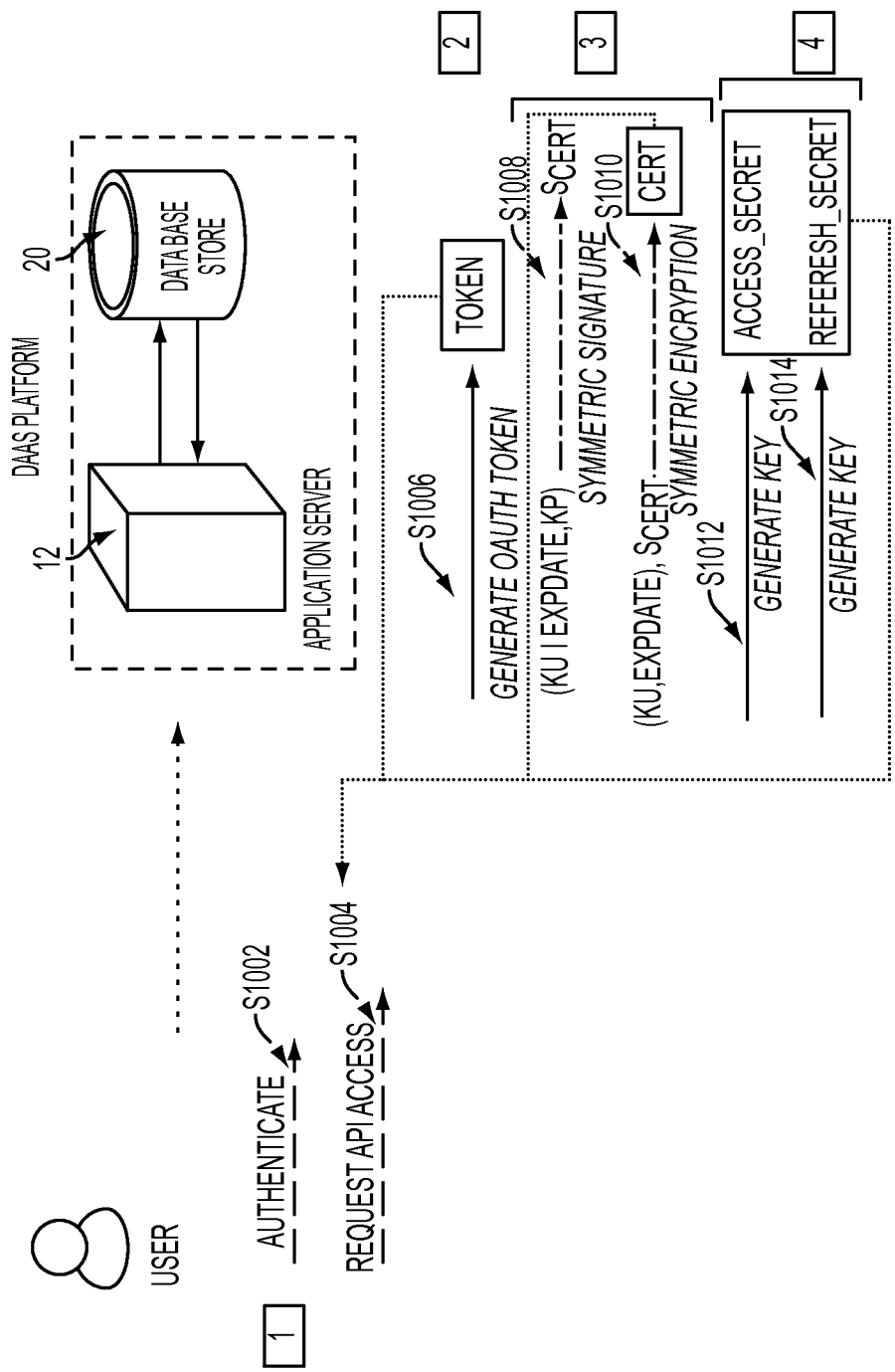
FIG. 11 is a flow chart illustrating providing a user with API access in the method of FIG. 3.

One problem that is faced with API access is that the system 10 cannot verify whether the call is coming from a legitimate user or not, unless a non-repudiation mechanism is integrated into the authentication process. In the following architecture for API call, such a mechanism is included. This can be implemented as shown in FIG. 11. On the client side:

1. A user who wants to have access to the data via API access first connects to the system through the web interface and authenticates (S1002), as described above for S104. Using a specific interface, the user requests an API access (S1004).

Given that the user has provided his/her password, the following steps are taken at the server, by the API access component 52:

2. An authentication token is generated which is to be used instead of the user's username and password (S1006).
3. The system calculates the KU and signs KU and the certificate expiration date ExpDate with the platform key KP, giving $S_{cert}$ (S1008) and encrypts KU, ExpDate and $S_{cert}$ to generate a certificate (S1010).
4. Two secret keys are randomly generated for the user (S1012, S1014), a secret access key access_secret and a secret refresh key refresh_secret. These two keys are used for non-repudiation purposes and sent to the user.

Note that all above security elements are substantially random and long enough to make the guessing process difficult for an attacker. Also it is assumed that the pair of keys access_secret, refresh_secret is saved in a secure way on the clients' device.

Figure 12:
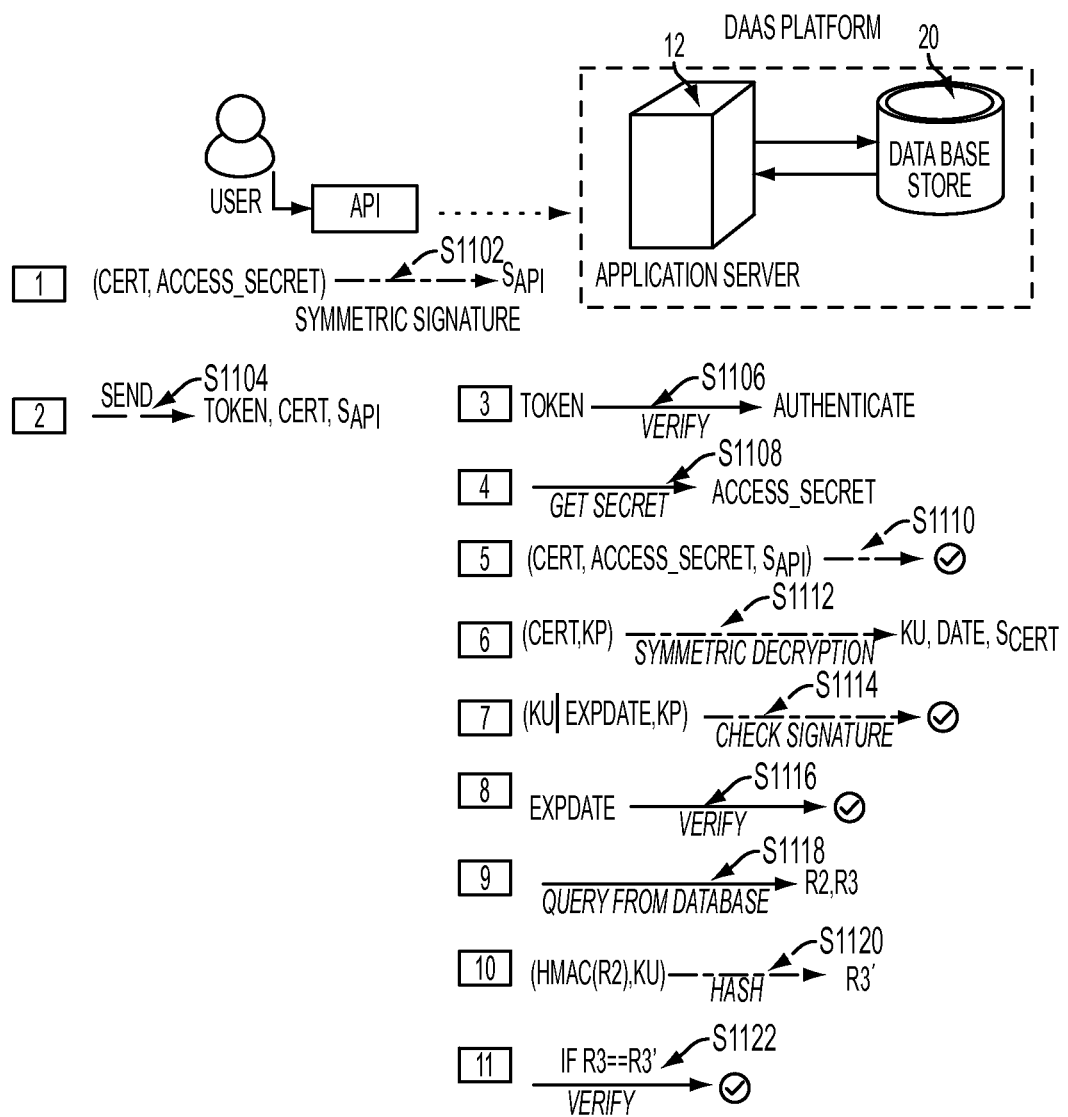
FIG. 12 is a flow chart illustrating verifying the user without needing the user password, following providing the user with API access, in the method of FIG. 3.

With reference now to FIG. 12, the following procedure may be implemented each time API access is sought.

1. On each API call, the user's client-side application is required to authenticate itself by signing the certificate, using the secret access key access_secret (S1102) to generate a signature $S_{API}$, and
2. send the authentication token together with the certificate and its signature $S_{API}$ to the server (S1104). These should all be sent together (S1106). This means that if an attacker captures the certificate alone, he would not be able to use it without having the signature or the authentication token.

On the server:

3. At each request, the system authenticates the token (S1108),
4. retrieves the secret access key access_secret for that user (S1110), and
5. verifies the signature $S_{API}$ of the user using the signed certificate and retrieved secret access key access_secret (S1112).
6. Then it decrypts the certificate to get the expiration date ExpDate, user's key KU, and $S_{cert}$ (S1114),
7. checks the signature $S_{cert}$ of the certificate (S1114),
8. checks whether or not the certificate is expired (S1116), to determine whether the user's user key KU is still valid, and optionally performs a further verification, as follows:
9. The database is queried to retrieve the two randoms R2, R3 (S1118)
10. The HMAC of R2 and KU is hashed giving R3' (S1120), and
11. R3 is compared with R3' to see if they match (S1122). If everything is verified satisfactorily, the user's request is then processed. This may include performing any of the steps previously described, such as database creation, database access, etc.

Figure 13:
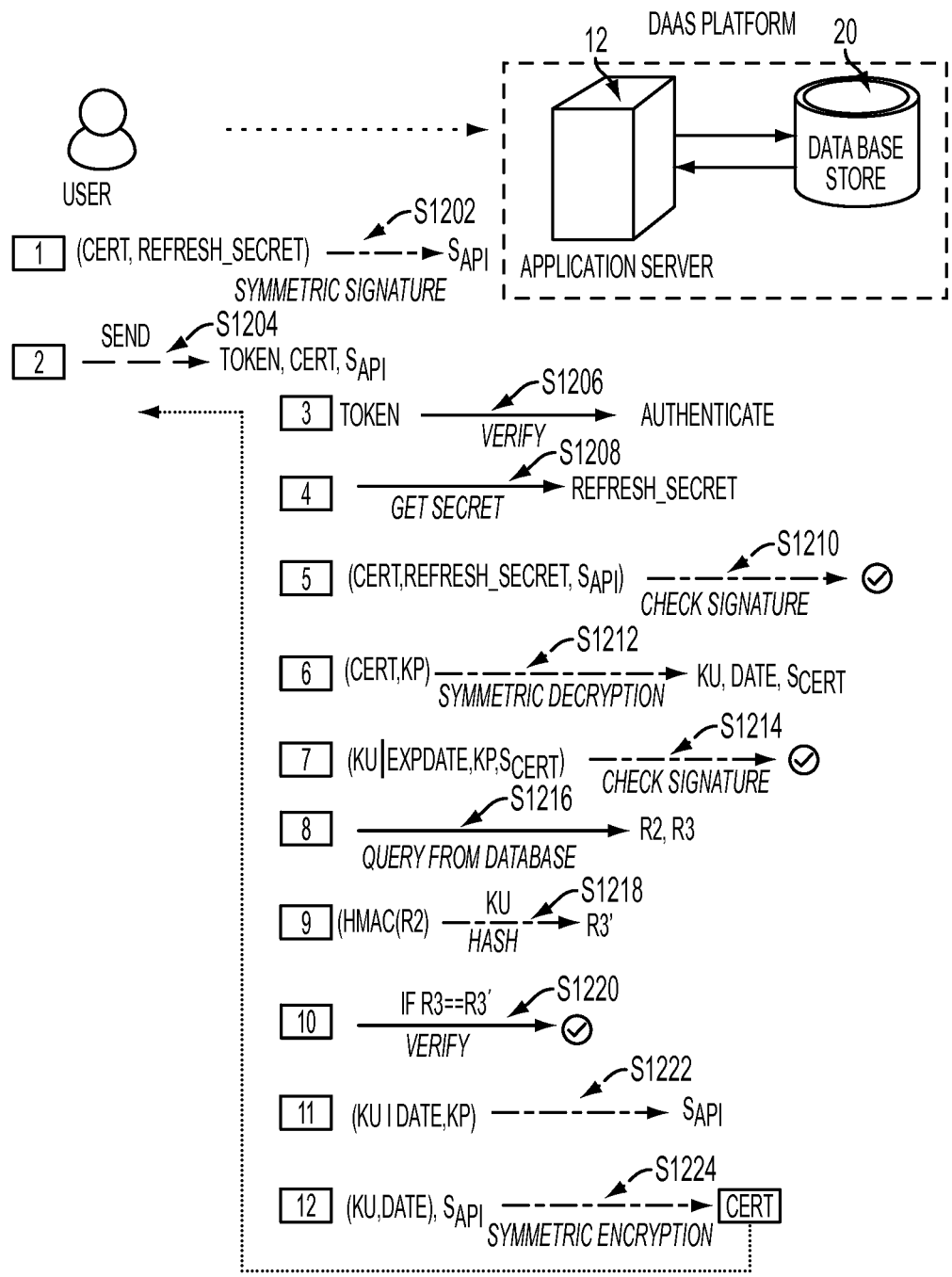
FIG. 13 is a flow chart illustrating refreshing the certificate for the user without needing the user password, following providing the user with API access, in the method of FIG. 3.

As noted above, the certificate contains an expiration date. The users may be provided with a mechanism to update their respective certificates using an API call. However, for non-repudiation reasons, the user is requested to sign the certificate again, but this time with another key. This is because if an attacker has captured the signatures of requests, he will not be able to employ them to update the certificate. So for each update call, the method may proceed as shown in FIG. 13:

1. the user is requested to sign the expired certificate using the refresh_secret key (S1202). The time stamp may also be required to be included in order to avoid further attacks.
2. The user sends the token, certificate and signature S to the server (S1204).

In this case, the server again verifies the validity of signatures and the correctness of the key. It then generates a new certificate and sends it back to the user. In particular:

3. At each request, the server authenticates the token (S1206),
4. retrieves the refresh_secret secret key (S1208) and
5. verifies the signature $S_{API}$ of the user (S1210).
6. Then it decrypts the user's key KU (S1212), and
7. checks the signature $S_{cert}$ of the certificate (S1214), and optionally performs the following verifications:
8. The database is queried to retrieve the two randoms R2, R3 (S1216)
9. The HMAC of R2 and KU is hashed giving R3' (S1218), and
10. R3 is compared with R3' to see if they match (S1220). If everything is verified satisfactorily, the user's request is then processed. This may include performing any of the steps previously described, such as database creation, database access, etc. If everything is verified satisfactorily, then user's request is then processed.

11. A new signature $S_{API}$ is created using a new date (S1222), and

12. A new certificate is created with the new date, the user key, and the signature $S_{API}$ and sent to the user (S1224).

H. Password Recovery

A password recovery method can be provided by the platform. Without such method, the user password used for encryption cannot be recovered, as it is not stored on the platform. So if a user forgets his or her password, it will not be possible to ask for a new password and restore the access to the databases. Additionally if the user is the only user of a database, the data may be lost. A secure password recovery mechanism may thus be provided for the platform.

At registration time, a series of challenge response questions (e.g., a minimum of 3 questions) will be asked from the user. The responses to all these questions are then put together to create a string. This string can then be used to create a key with which the password will be encrypted and saved on the server. At the time of clicking on the "Forgot Password?" link, an email is sent to the user that contains a link (which includes a long and hardly guessable random string) to the question page (a first step of user authentication). In the page, the same questions will be asked from the user. Using the answers the key will be recalculated by the key regeneration component 56. If the key is correct, then the password will be retrieved and the data can then be decrypted (second step of authentication). Finally, the user is asked to enter a new password.

The exemplary platform provides a complete solution for a secure semi-trusted DaaS. However, depending on the requirements of a specific platform, only some parts of the solution may be implemented. As examples, one or more of the following may be implemented:

In one embodiment, it is assumed that the data owners completely trust the data users. As a result the fingerprinting mechanism need not be implemented.

In some cases, the encryption of the data is not considered necessary, but the identification of malicious distribution of the data is desired. In this embodiment, the databases may be stored in a clear form on the platform, but they are fingerprinted at time of distribution. As a result, the fingerprinting stage may be implemented as follows: instead of encrypting the KM with K (which is the hash of KD and KP) at the time of database creation, it may be encrypted by KP. Consequently, at the moment of database access, the KM' is decrypted using KP.

While current DaaS services offer two types of systems, i.e., trusted and non-trusted, the present system can offer a semi-trusted service, alone or in combination with a trusted and/or a non-trusted platform. The exemplary semi-trusted platform provides for a DaaS solution where there is a balance between the level of trust and the complications of cryptographic processes and key management over the end-users. This means that by managing the keys and cryptographic operations, the system does not impose burdens on the user of non-trusted systems and by restricting the access for DBMS administrators to user's data while at rest, privacy and confidentiality for the users can be preserved. Additionally, by bringing fingerprinting solutions to the platform, assurance and traceability can be provided to the data owners.

Now described are further details of various database fingerprinting mechanisms.

By way of comparison, watermarking is a method for information hiding. Its purpose is to prove an ownership of a certain digital product (in a case of a malicious copy). Such technique is widely used in digital photography, audio and video industries. During the last decade researchers have proposed algorithms to apply watermarking to relational databases. However proofs for ownership is not always sufficient and there would be a need to identify the source of the leakage. As for databases, which might contain sensitive information, there is a risk that the trusted users who have access to such data may maliciously distribute all or some parts of the database.

"Fingerprinting is a class of information hiding techniques that insert digital marks into data with the purpose of identifying the recipients who have been provided data". As a result, this mechanism gives the ability to the data owner to identify who was at the origin of the data distribution, i.e., which authorized data consumer actually leaked the data to unauthorized parties, and the ability to take appropriate actions. As a result, such technique assures data owners that not only they will be able to identify data leakers but also this might make the consumers reluctant to distribute the data, as they know that they can be unmasked.

These techniques are always involved with embedding a watermark or a fingerprint string inside the original data. In many cases, this implies that such mechanisms can cause a data precision loss by introducing small changes to the contents. For example for fingerprinting numerical values in a database, the least significant bits (LSB) are the best candidates for the insertion process. However, the difference between database watermarking/fingerprinting and watermarking of multimedia documents is that in the latter, the loss of precision can be designed to be unnoticeable by a human, whereas in the former, a small change to the actual data (numeric or string values) might be noticeable to the users. And as a result of such data modification the data owner might be reluctant to use the fingerprinting mechanism.

In order to reduce such noticeability and make smaller changes, it is much better to distribute the modification of data over different data attributes (columns). Current database watermarking/fingerprinting algorithms are limited to modification of values of type numeric, i.e. integer, string and date. This limits the fingerprinting options to certain databases, since there are databases that might not even contain these types of data. This following detailed description extends these options by offering fingerprinting mechanism over other types of data with minor changes.

Provided now are details of algorithm for embedding a fingerprint and how different data types are treated. In addition, described is fingerprint detection and identification of the users at the time of unauthorized distribution of data.

As explained earlier, fingerprinting/watermarking technique is about embedding a bit string inside a digital content. Consequently, the role of the bit string and its security becomes important. The fingerprint/watermark bit string can be generated in different ways. For example in LAFAYE et al., "Watermill: An Optimized Fingerprinting System for Databases Under Constraints", IEEE Transactions on Knowledge and Data Engineering, Vol. 20, No. 4, April 2008, pages 1-15, the authors have proposed that the bit string can be generated by randomly choosing the bits from an image. Or as explained in patent application Ser. No. 14/255,252, filed Apr. 17, 2014, by ESTEHGHARI et al., and entitled "Semi-Trusted Data-as-a-Service Platform", HANYURWIMFURA et al., "Text Format Based Relational Database Watermarking for Non-numeric Data", 2010 International Conference on Computer Design and Applications (ICCDA 2010), Volume 4, pages V4-312 to V4-316 and GUO et al., "Fingerprinting Relational Databases", SAC'06, Apr. 23-27, 2006, Dijon, France, pages 487-492, it can be generated by a random generator. Although the watermarking and fingerprinting techniques are similar, they can be differentiated at this stage. Since the purpose of fingerprinting is the user identification, then the bit string must contain the user identifier. Consequently the fingerprint for each user is different from one another. The approach provided herein for fingerprint generation is generating a new secret key (K) for the database and then for each user calculating the hash of a string, which is the result of concatenating the K with the user's identifier (ID), where for each user n: $F(K, ID_n) = H(K \cdot ID_n)$ It should be noted that the length of fingerprint bit string and secret key should be at minimum 64 and 128 bits, respectively. The secret key must be saved securely by the owner and the users shouldn't have any knowledge about the secret key nor the fingerprint bit string.

The fingerprinting algorithm which is explained in this section is based on the one proposed in "Yingjiu Li, Vipin Swarup, and Sushil Jajodia. 2005. Fingerprinting Relational Databases: Schemes and Specialties. IEEE Trans. Dependable Secur. Comput. 2, 1 (January 2005), 34-45." However, changes have been made to make it more efficient for smaller databases. Also new functions, which are going to be explained in detail, have been added to the base algorithm.

Database fingerprinting algorithms are composed of two main functions: insertion (or embedding) and detection.

Using the insertion function, the database owner is able to embed the fingerprint of a user inside the data before being accessed by him/her. And since the bit string is different from one user to another, this process must be done for each user separately.

This function results in the modification of the original values of certain attributes in the database. This implies that the target database should be error tolerant. However, the algorithm itself doesn't have the knowledge about the possible modifiable attributes. Therefore, the database owner must select the columns that can tolerate minor changes.

For insertion process, certain rows are randomly selected by grouping, partitioning or sequentially choosing them. Then for each selected row, one or more modifiable attributes are randomly chosen. Afterwards, a random bit from the fingerprint should be picked in order to be inserted inside the value of the chosen attribute.

As can be noticed, the randomness is an important factor in the technique. Such randomness reduces the probability that an attacker traces the inserted bits. However, having a completely random function for embedding might result in different outputs at each insertion of the same bit string on the same data: this might allow the users to detect the insertion of the fingerprint bits at each access. On the other hand it should be also possible for the database owner to detect the fingerprint without having the bit string or the original database. In order to fulfill these requirements, in the disclosed algorithm a pseudorandom function (S(x)) is used at each insertion for selecting the row, the attribute (Algorithm 1, lines 5 to 7) and the bit string's index (Algorithm 2, line 7). The difference between a pseudorandom and a random function is that in the former, the random function is seeded with a parameter. This implies that giving the same seed to the function generates the same output every time. Assuming that each row has a fixed primary key (PK) (of type integer), then such element can be used as a seed to feed the pseudorandom function. In the disclosed algorithm, in order to add more randomness to the seed, the primary key is concatenated with the K (S(K·PK)). The function S is used several times in our algorithms. In order to differentiate each step, we have indexed the function with a number (e.g. $S_1$, $S_2$, . . . ).

TABLE 1

Notation Table

| | |
|---|---|
| PK: Primary Key | K: Secret key |
| v: Number of attributes | 1/γ: Fraction of tuples used in fingerprinting |
| L: Length of fingerprint | S: Pseudo-random sequence generator |

Here is how the insertion process shown in Algorithm 1 functions:

At the beginning of the process the fingerprint F for this user is calculated. The issue that we have faced in the development of such function is that we wanted to make sure that all the bits of the fingerprint bit string (of length L) are, at least for one time, embedded in the rows. As a result we have reserved a list (so-called indexes) of size L which contains the indexes from 0 to L−1. The list is shuffled every L rows that are fingerprinted. In this algorithm we have called every L rows a "round".

Then for each row the following steps are taken:

The function prepareForRound (shown in Algorithm 2) is called. The role of this method is to choose a fingerprint bit index for this row. The method divides the PK by L to get the "quotient" and the "remainder". If the quotient is not equal to the round then the round is set to the quotient and the indexes list will be shuffled pseudorandomly. The remainder is, then, used as an index to choose a value from indexes.

If the ($S_1$(K,PK)mod y==0) (Algorithm 1, line 5) is true, then the row is chosen. This implies that only one row is selected at each group of γ rows. Then for this selected row:

If v>1 (if the number of chosen columns by the owner is greater than 1), then the attribute i is chosen (i=$S_2$(K, PK)mod v). Otherwise the only chosen attribute is used.

Then the mask bit x is calculated, x=$S_3$(K, PK) mod 2, which is then used to calculate the mark bit m by doing an Exclusive OR (XOR) over x and the selected bit of the fingerprint f.

Having the mark bit m and the attribute i, then getDataTypeofColumn(i,m) is called to embed m inside the attribute's value. In the next section, this function will be explained in further detail.

Finally the function returns a fingerprinted database as the result.

| Algorithm 1 Insertion Function |
|---|
| 1. Fingerprint of user n : $F(K, ID_n) = H(K.ID_n)$ // the FP of the user n |
| 2. round o = −1 |
| 3. foreach row r ∈ R do |
| 4.     FP_index l = prepare For Round (PK,L,o)    //index of the FP's to be inserted |
| 5.     if ($S_1$(K,PK)mod y = = 0 ) then    //the row to be modified |
| 6.         attribute_ index i = $S_2$ (K,PK)mod v    //the attribute to be marked in row |
| 7.         mask_bit x = $S_3$(K,PK)mod 2 |
| 8.         FP_bit f = f[l]    // select FB bit at index l |
| 9.         mark_bit m = x ⊕ f    // the bit to be inserted |
| 10.         insertFPBasedOnDataType (i,m)    // embed m in attribute I on data type |
| 11. return R |

| Algorithm 2 PrepareForRound function |
| --- |
| 1. quotient q = PK / L; |
| 2. remainder r = PK mod L |
| 3. list indexes = {0,....,127} |
| 4. if o ! = q then |
| 5. o = q |
| 6. shuffle (o,K,indexes) |
| 7. FP_index l = indexes [r] |
| 8. return l |

Insertion based on Data type:

As is shown in Algorithm 1, at line 10, the fingerprint bit is embedded inside the selected attribute. However this insertion is done based on the data type of the selected column (i). In other words the way of embedding m is based on the attribute's data type. In the disclosed algorithm the following data types are targeted:

Integer, Long: if the attribute is of type integer or long then the least significant bit (only one bit) of the value is replaced by m.

Float (Single), Double, Decimal: Due to the decimal point in these data types, it is much more complicated to treat them for the insertion process. The binary representation of these is much different than the integers and changing the least significant bit has a different impact on the value. The approach for these types of data relies on the one defined for integers. Starting by using the normalized scientific notation of the number $\alpha*10^b$, where $1<|\alpha|<10$, the number "$\alpha$" can be written as $\alpha$=x.xxxxx (where x can be any digit). Then, the algorithm splits the value of a into two parts from the decimal point. Then, the decimal part value is obtained and treated as an integer. This implies that the least significant bit of this value is marked in the same way as it is done for the integers. After the embedding process, the two parts are concatenated again together with a decimal point. The only difficulty encountered is when the embedding process transforms the last digit in the value of 0. In the representation of floating point numbers, the last zero is always ignored. This implies that in this case, the fingerprint bit embedded in this value is lost. The solution for this problem is that if m is equal to 0 and the last digit of the decimal part of the value is equal to 1 then the value of the decimal is incremented by one and then marked the least significant bit.

Geography: geographic values are represented as a set of attributes (e.g., Latitude, Longitude, and Altitude). Several of these values are of type Double. This implies that these values can be marked in the same way as doubles mentioned above. Notably, the research performed focused on inserting the fingerprint in the first two values, i.e., Latitude and Longitude. However, small changes in the decimal part of this type of data dramatically impact the original value, and this is not ideal for geographical data. On the other hand, it has been learned that, as the number of digits in the decimal part increases, changes in the least significant bit become negligible. As a result, before marking the value, the algorithm first counts the number of digits in the decimal part value and if it is less than 6 then it is enlarged as follows:

If the count is less than or equals to 3, concatenate 6—(count +2) zeros and a random number between 11 and 20 to the end of the value. Otherwise, concatenate 6—(count +1) zeros and a random number between 1 and 10 to the end of the value.

The reason the zeros are added is to minor the modifications in geographical points. After the concatenation, the algorithm marks the least significant bit of the result, reconstructs the double value, as discussed above, and finally recreates the geographical points.

String: the method for marking the string that is used in this algorithm is the mixture of solutions proposed in "Hanyurwimfura, D.; Yuling Liu; Zhijie Liu, "Text format based relational database watermarking for non-numeric data," Computer Design and Applications (ICCDA), 2010 International Conference on, vol. 4, no., pp. V4-312, V4-316, 25-27 June 2010" and "Lizhong Zhang; Wei Gao; Nan Jiang; Liqiu Zhang; Yan Zhang, "Relational databases watermarking for textual and numerical data," Mechatronic Science, Electric Engineering and Computer (MEC), 2011 International Conference on , vol., no., pp. 1633, 1636, 19-22 Aug. 2011". Here, the strings are divided in three categories:

1. Single Worded: for marking single worded strings, the algorithm adds a carriage return (\r) if m is 1 and a line feed (\n) otherwise, to the end of the string.

2. Double Worded: for this category, if m is 1, the algorithm adds an extra space in between the words. Otherwise, the string remains unchanged.

3. Sentences: marking the sentences is the same as double worded with one difference. In this case, the space is added between the words that has the minimum Levenshtein distance in the sentence, see "Levenshtein distance http://en.wikipedia.org/wiki/Levenshtein_distance". Using this metric adds a form of randomness in the insertion process, since the distance might change from attribute to attribute.

Date: "Odeh, A.; Al-Haj, A., "Watermarking relational database systems," Applications of Digital Information and Web Technologies, 2008. ICADIWT 2008. First International Conference on the , vol., no., pp. 270,274, 4-6 Aug. 2008", to mark Date values. In "Odeh, A.; Al-Haj, A., "Watermarking relational database systems," Applications of Digital Information and Web Technologies, 2008. ICADIWT 2008. First International Conference on the , vol., no., pp.270, 274, 4-6 Aug. 2008", the authors assumed that "seconds" are the most insignificant parts of the data. Accordingly, in the disclosed algorithm, the "seconds" are extracted from the date value and then marked like an integer. The date value is then reconstructed using the new "seconds".

Detection:

The purpose of this function is to detect the embedded fingerprint inside the database. The detection function is similar to the insertion but in a reverse direction. This implies that using this method, the embedded fingerprint is retrieved from a received database R' (from the outside of the system). As a result, the same row and attribute selection is performed, to get the same fingerprint bit index by calling the prepareForRound function and the same value for the mask bit (steps from 2 to 7). However, in contrast to modifying a value, this function is based on the data type of the value being retrieved, i.e., the marked bit. The fingerprint bit is calculated by doing an Exclusive OR (XOR) over the mask and the mark bits. The bit detection based on data type is done as follows:

Integer, Long: the least significant bit is retrieved.

Float (Single), Double, Decimal: The value is split into two parts from the decimal point. Then the least significant bit of the decimal part value is retrieved.

Geography: Assuming that the longitude or latitude value is used for the insertion process, then the mark is detected in the same way explained for the doubles.

String:

Single Worded: for each string the algorithm checks whether there exists a carriage return (\r) or a line feed (\n) and detects the mark as 1 or 0 accordingly.

Double Worded: if the algorithm detects an extra space then the mark bit is detected as 1 and 0 otherwise.

Sentences: the detection process is the same as double worded with one difference. In this case, the algorithm gets the words with the minimum Levenshtein distance, see "Levenshtein distance http://en.wikipedia.org/wiki/Levenshtein_distance:, and checks whether there exists an extra space in between them or not.

Date: The "seconds" value is retrieved from the date value and the mark is detected in the same way as the integers.

The detection method is based on a voting mechanism where there are two counters for values 0 and 1 for each fingerprint bit. Based on the value of the detected fingerprint bit (being 0 or 1) the corresponding counter is increased for this fingerprint bit index. Finally, when the fingerprint detection over the R' is finished, the algorithm uses the two counters count[i][0] and count[i][1] to determine the value of $f_i$. For this reason the threshold $\tau \in [0.5,1)$ is selected according to which the $f_i$ is equal to 0 if $$\frac{\text{count}[i][0]}{\text{count}[i][0] + \text{count}[i][1]} > \tau$$

and equal to 1 if $$\frac{\text{count}[i][1]}{\text{count}[i][0] + \text{count}[i][1]} > \tau$$

and if none of these cases were true then the fingerprint bit is not detected. The algorithm then recovers $F=(f_0, \ldots, f_{L-1})$. It, then, goes through the list of legitimate users, calculate the fingerprint for each user and compares it with F. This continues until a match has been found.

| Algorithm 3 Detection function | | |
|---|---|---|
| 1. | foreach i = 0 to L − 1 do count[i][1] = count[i][1] = 0 | //count [i][0], count [i][1] are votes for $f_1$ to be 0 and 1 respectively |
| 2. | round o = −1 | |
| 3. | foreach row r ∈ R' do | |
| 4. | FP_Index l = prepareForRound (PK, L, o) | //index of the FP's bit for this row |
| 5. | If ($S_1$(K, PK) mod γ == 0) then | //the fingerprinted row |
| 6. | attribute_index i = $S_2$(K, PK) mod v | //the marked attribute |
| 7. | mask_bit x = $S_3$(K, PK) mod 2 | |
| 8. | mark_bit m = getFBBasedOnDataType (i, m) | //get the mark bit from the attribute by data type |
| 9. | FP_bit f = x ⊕ m | //embedded fingerprint bit |
| 10. | count[l][FP_bit] = count[l][FP_bit] + 1 | //update the votes |
| 11. | Foreach i = 0 to L − 1 do | |
| 12. | if count [i][0] + count[i][1] = 0 then return none | |
| 13. | $f_i = 0$ if $\frac{\text{count}[i][0]}{\text{count}[i][0] + \text{count}[i][1]} > \tau$ | |

| Algorithm 3 Detection function | | |
|---|---|---|
| 14. | $f_i = 1$ if $\frac{\text{count}[i][1]}{\text{count}[i][0] + \text{count}[i][1]} > \tau$ | |
| 15. | return none suspect otherwise | |
| 16. | F = ($f_0, \ldots, f_{L-1}$) | |
| 17. | foreach user n do | //recognize the user by comparing the detected fingerprint with theirs |
| 18. | F' = H(K.IDn) | |
| 19. | If F equals F' then return n | |
| 20. | return − 1 | |

Bit Insertion Frequency.

In the description of the algorithm above, it is assumed that, at most, one bit of information is inserted for a specified value. However, depending on the size of the data or the length of the fingerprint, it is also possible to add more information:

By using several fields (columns) of the same row to insert fingerprint data.

By inserting several bits of data at once into the same attribute.

For instance, if the system can use two fields to insert the fingerprint, and it can modify two bits for each field, it only needs 16 rows to insert a 64 bits fingerprint.

Fingerprint insertion on floating point numbers

The disclosed method/system for inserting a fingerprint bit into a floating point number field is to process the decimal part of the number as an integer, and use the method for integers. This method is adequate if every processed value includes a sufficient number of digits, to avoid changing the value too much. If some values do not have enough digits, the same approach as used for geographical data can be utilized, where an arbitrary precision is defined for inserting the fingerprint bit. For instance, choosing to insert the bit at the fifth position of the decimal number, adding a 1 bit to 5.02 will return 5.02001, 5.0002 will return 5.00021, and 5.0 will return 5.00001. The distortion created by the fingerprinting remains consistent.

Partial Dataset.

Described hereto are exemplary embodiments of methods of insertion and detection of fingerprints in a database. In some cases, a user may access a partial dataset, e.g. data returned by a specific query, i.e., data related to a specific period, place, person, etc. As described above, the fingerprint data is added based on the primary key, so whatever the query, a specific row always contain the same fingerprint bit.

The algorithm disclosed makes sure that, assuming enough consecutive rows (rows with consecutive primary keys), the fingerprint will be fully inserted. For instance, if the data owner decides to insert 1 fingerprint bit per row, and the fingerprint size is 64 bits, it will be inserted in 64 consecutive rows. And given the randomness of bit insertion, it can be assured that the full fingerprint is available in any 127 consecutive rows.

If the user only has access to a partial dataset where rows may not be consecutive, e.g., from a query result, there is no guarantee that the full fingerprint will be inserted, which makes the detection process more difficult, which leads to the next section of this disclosure.

Partial Fingerprint.

When only a partial fingerprint is available in a given dataset, for example not enough rows, or not enough consecutive rows, detection is not as straightforward as otherwise.

Normally, the algorithm goes through the list of legitimate users, calculates the fingerprint for each user and compares it with the extracted fingerprint. This continues until a match is found.

In the case of partial fingerprint, it is still possible to extract a certain number of fingerprint bits, and to compare those bits with all fingerprints for legitimate users. Only a small number of users will have a matching fingerprint, and in most cases, only one.

Evolving Dataset.

A database may contain evolving data: new rows are added, older rows may be updated or deleted. Is it possible to detect a fingerprint that was inserted a while ago, now that the data has changed?

As was previously discussed, the disclosed algorithm does not rely on the unaltered data to extract the fingerprint. So even if the dataset has changed, it is still possible to extract the fingerprint.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of fingerprinting a relational database associated with a computer memory with a unique identifier associated with a user of the relational database, the relational database configured to include a plurality of rows associated with a plurality of tuples, a plurality of attribute columns associated with each row, a plurality of unique primary keys wherein each primary key is associated with a unique row, and a plurality of attributes wherein each attribute is associated with a tuple and a respective attribute column, the method comprising:
   a) generating a fingerprint bit string including a data user identification code and a secret key (k) unknown to the user and unique to the relational database; and
   b) embedding the fingerprint bit string in the relational database by modifying a plurality of pseudorandomly selected attribute values in a plurality of respective rows, the pseudorandomly selected attribute values associated with one or more columns determined by an originator of the relational database to be tolerant of modifications,
   wherein a pseudorandom function S(x) is used to determine a row, to determine an attribute to modify within the row and to determine a bit string index associated with a sequence of rows to embed the fingerprint bit string, the pseudorandom function S(y) seeded with one of the primary keys associated with the row and the primary key associated with the row concatenated with the secret key;

wherein the plurality of attributes include a plurality of data types, and the plurality of pseudorandomly selected attribute values are modified to embed the fingerprint bit based on one of a plurality of processes, where each process is associated with one distinct data type associated with the attribute; and wherein the data types include one or more of a Float, Double, and Decimal, and the Float, Double and Decimal type attribute values are initially represented using normalized scientific notation of the attribute value of the form $\alpha * 10^b$, where $1<|\alpha|<10$, and subsequently the least significant bit associated with $\alpha$ is modified.

2. The computer-implemented method of fingerprinting a relational database according to claim 1, wherein the fingerprint bit string is the hash of the data user identification code and the secret key.

3. The computer-implemented method of fingerprinting a relational database according to claim 1, wherein the length of the fingerprint bit string is at least 128bits and the length of the secret key is at least 64 bits.

4. A system for fingerprinting a relational database associated with a computer memory with a unique identifier associated with a user of the relational database, the relational database configured to include a plurality of rows associated with a plurality of tuples, a plurality of attribute columns associated with each row, a plurality of unique primary keys wherein each primary key is associated with a unique row, and a plurality of attributes wherein each attribute is associated with a tuple and a respective attribute column, the system comprising:

a fingerprinting component configured to generate a fingerprint bit string including a data user identification code and a secret key (k) unknown to the user and unique to the relational database; and an embedding component configured to embed the fingerprint bit string in the relational database by modifying a plurality of pseudorandomly selected attribute values in a plurality of respective rows, the pseudorandomly selected attribute values associated with one or more columns determined by an originator of the relational database to be tolerant of modifications, wherein a pseudorandom function S(x) is used to determine a row, to determine an attribute to modify within the row and to determine a bit string index associated with a sequence of rows to embed the fingerprint bit string, the pseudorandom function S(y) seeded with one of the primary keys associated with the row and the primary key associated with the row concatenated with the secret key;

wherein the plurality of attributes include a plurality of data types, and the plurality of pseudorandomly selected attribute values are modified to embed the fingerprint bit based on one of a plurality of processes, where each process is associated with one distinct data type associated with the attribute; and wherein the data types include one or more of a Float, Double, and Decimal, and the Float, Double and Decimal type attribute values are initially represented using normalized scientific notation of the attribute value of the form $\alpha * 10^b$, where $1<|\alpha|<10$, and subsequently the least significant bit associated with $\alpha$ is modified.

5. The system for fingerprinting a relational database according to claim 4, wherein the fingerprint bit string is the hash of the data user identification code and the secret key.

6. The system for fingerprinting a relational database according to claim 4, wherein the length of the fingerprint bit string is at least 128 bits and the length of the secret key is at least 64 bits.

7. A computer-implemented method of fingerprinting a relational database associated with a computer memory with a unique identifier associated with a user of the relational database, the relational database configured to include a plurality of rows associated with a plurality of tuples, a plurality of attribute columns associated with each row, a plurality of unique primary keys wherein each primary key is associated with a unique row, and a plurality of attributes wherein each attribute is associated with a tuple and a respective attribute column, the method comprising:

a) generating a fingerprint bit string including a data user identification code and a secret key (k) unknown to the user and unique to the relational database; and b) embedding the fingerprint bit string in the relational database by modifying a plurality of pseudorandomly selected attribute values in a plurality of respective rows, the pseudorandomly selected attribute values associated with one or more columns determined by an originator of the relational database to be tolerant of modifications, wherein a pseudorandom function S(x) is used to determine a row, to determine an attribute to modify within the row and to determine a bit string index associated with a sequence of rows to embed the fingerprint bit string, the pseudorandom function S(v) seeded with one of the primary keys associated with the row and the primary key associated with the row concatenated with the secret key;

wherein the plurality of attributes include a plurality of data types, and the plurality of pseudorandomly selected attribute values are modified to embed the fingerprint bit based on one of a plurality of processes, where each process is associated with one distinct data type associated with the attribute; and wherein the data types include geographical data and the geographical data types are represented as a set of attributes including a latitude value including a decimal portion and longitude value including a decimal portion, wherein one of the latitude value or longitude value is modified by counting the number of digits in the decimal portion and if it includes less than 6 digits, the decimal portion is expanded as follows:

if the count is less than or equal to 3, concatenate 6−(count+2) zeros and a random number between 11 and 20 to an end of the value, otherwise, concatenate 6−(count +1) zeros and a random number between 1 and 10 to the end of the value.

8. A system for fingerprinting a relational database associated with a computer memory with a unique identifier associated with a user of the relational database, the relational database configured to include a plurality of rows associated with a plurality of tuples, a plurality of attribute columns associated with each row, a plurality of unique primary keys wherein each primary key is associated with a unique row, and a plurality of attributes wherein each attribute is associated with a tuple and a respective attribute column, the system comprising:

a fingerprinting component configured to generate a fingerprint bit string including a data user identification code and a secret key (k) unknown to the user and unique to the relational database; and an embedding component configured to embed the fingerprint bit string in the relational database by modifying a plurality of pseudorandomly selected attribute values in a plurality of respective rows, the pseudorandomly selected attribute values associated with one or more columns determined by an originator of the relational database to be tolerant of modifications, wherein a pseudorandom function S(x) is used to determine a row, to determine an attribute to modify within the row and to determine a bit string index associated with a sequence of rows to embed the fingerprint bit string, the pseudorandom function S(y) seeded with one of the primary keys associated with the row and the primary key associated with the row concatenated with the secret key;

wherein the plurality of attributes include a plurality of data types, and the plurality of pseudorandomly selected attribute values are modified to embed the fingerprint bit based on one of a plurality of processes, where each process is associated with one distinct data type associated with the attribute; and wherein the data types include geographical data and the geographical data types are represented as a set of attributes including a latitude value including a decimal portion and longitude value including a decimal portion, wherein one of the latitude value or longitude value is modified by counting the number of digits in the decimal portion and if it includes less than 6 digits, the decimal portion is expanded as follows:

if the count is less than or equal to 3, concatenate 6−(count +2) zeros and a random number between 11 and 20 to an end of the value, otherwise, concatenate 6−(count +1) zeros and a random number between 1 and 10 to the end of the value.

* * * * *